US010204351B2

(12) United States Patent
Tawakol et al.

(10) Patent No.: US 10,204,351 B2
(45) Date of Patent: Feb. 12, 2019

(54) PROFILE NOISE ANONYMITY FOR MOBILE USERS

(75) Inventors: Omar Tawakol, Los Altos, CA (US); Lucian Vlad Lita, Sunnyvale, CA (US)

(73) Assignee: BLUE KAI, INC., Redwood Shores, CA (US)

( * ) Notice: Subject to any disclaimer, the term of this patent is extended or adjusted under 35 U.S.C. 154(b) by 361 days.

(21) Appl. No.: 13/595,764

(22) Filed: Aug. 27, 2012

(65) Prior Publication Data

US 2013/0282733 A1 Oct. 24, 2013

Related U.S. Application Data

(63) Continuation-in-part of application No. 13/455,024, filed on Apr. 24, 2012.

(51) Int. Cl.
*G06Q 10/10* (2012.01)
*G06F 17/30* (2006.01)
(Continued)

(52) U.S. Cl.
CPC ....... *G06Q 30/02* (2013.01); *G06F 17/30867* (2013.01); *G06F 21/6254* (2013.01); *G06Q 10/10* (2013.01); *G06Q 50/265* (2013.01)

(58) Field of Classification Search
USPC .............................. 705/14.66, 325; 713/167
See application file for complete search history.

(56) References Cited

U.S. PATENT DOCUMENTS 7,177,851 B2 * 2/2007 Afeyan ................... G06F 17/50
706/13
7,996,912 B2 8/2011 Spalink et al.
(Continued)

FOREIGN PATENT DOCUMENTS

CN 101014935 8/2007
CN 101583949 11/2009
(Continued)

OTHER PUBLICATIONS

"Removing the 'You' in Online Targeting—Online Advertising Works Just Fine Without Personal Information," Omar Tawakol, Advertising Age, Oct. 11, 2011.
(Continued)

*Primary Examiner* — Eric R Netzloff
*Assistant Examiner* — Dipen M Patel
(74) *Attorney, Agent, or Firm* — Kilpatrick Townsend & Stockton, LLP

(57) ABSTRACT

Embodiments are directed towards collecting, aggregating and indexing unique and non-unique user data from a plurality of users. The result for a query of this indexed aggregation of user data is provided in a plurality of sub-sets of aggregated user data. Each subset of aggregated user data corresponds to a particular portion of the plurality of users. Also, each of these particular portions of the users is set at least large enough to provide general anonymity for the individual users. User data may be collected by one or more user data suppliers and provided to a user data aggregator. In some embodiments, user data may be collected as unique user data, non-unique user data, or any combination thereof. In some embodiments, user data may be aggregated by zip code, expanded zip code, and/or one or more attributes.

17 Claims, 13 Drawing Sheets

(51) Int. Cl.
*G06F 21/62* (2013.01)
*G06Q 30/02* (2012.01)
*G06Q 50/26* (2012.01)

(56) References Cited

U.S. PATENT DOCUMENTS

| | | | |
|---|---|---|---|
| 8,180,675 B2 | 5/2012 | Blasko et al. | |
| 8,251,702 B2 | 8/2012 | Marks | |
| 8,495,143 B2 * | 7/2013 | Zhou et al. | 709/204 |
| 8,559,927 B2 | 10/2013 | Kim | |
| 9,076,016 B2 * | 7/2015 | Raman | G06F 21/6263 |
| 2001/0032128 A1 * | 10/2001 | Kepecs | 705/14 |
| 2002/0099671 A1 * | 7/2002 | Mastin Crosbie | G06F 17/30867 705/500 |
| 2005/0261953 A1 * | 11/2005 | Malek | G06Q 30/02 705/7.32 |
| 2007/0083493 A1 * | 4/2007 | Dwork | G06F 21/6254 |
| 2007/0162301 A1 | 7/2007 | Sussman et al. | |
| 2007/0282796 A1 * | 12/2007 | Evenhaim | G06F 19/3443 |
| 2008/0275719 A1 | 11/2008 | Davis et al. | |
| 2008/0306895 A1 * | 12/2008 | Karty | G06Q 10/04 706/52 |
| 2009/0163183 A1 * | 6/2009 | O'Donoghue et al. | 455/414.1 |
| 2009/0171760 A1 | 7/2009 | Aarnio et al. | |
| 2009/0216551 A1 | 8/2009 | Chen et al. | |
| 2009/0254971 A1 * | 10/2009 | Herz | G06Q 10/10 726/1 |
| 2009/0299819 A1 | 12/2009 | Davis et al. | |
| 2010/0076775 A1 | 3/2010 | Tesler et al. | |
| 2011/0015989 A1 | 1/2011 | Tidwell et al. | |
| 2011/0035288 A1 * | 2/2011 | Clyne | G06Q 30/02 705/14.71 |
| 2011/0060905 A1 * | 3/2011 | Stack | G06Q 10/10 713/167 |
| 2011/0087546 A1 | 4/2011 | Fordyce, III et al. | |
| 2011/0178943 A1 * | 7/2011 | Motahari | G06F 21/6254 705/325 |
| 2011/0255688 A1 * | 10/2011 | Spalink | G06F 21/6254 380/29 |
| 2012/0089605 A1 | 4/2012 | Bangalore et al. | |
| 2012/0095862 A1 * | 4/2012 | Schiff | G06Q 30/0282 705/26.7 |
| 2012/0110071 A1 * | 5/2012 | Zhou | G06Q 10/10 709/204 |
| 2012/0226538 A1 | 9/2012 | Tawakol et al. | |
| 2012/0226559 A1 | 9/2012 | Baum et al. | |
| 2013/0282493 A1 | 10/2013 | Lita et al. | |

FOREIGN PATENT DOCUMENTS

| | | | |
|---|---|---|---|
| CN | 101828167 | 9/2010 | |
| CN | 101960477 | 1/2011 | |
| CN | 104685523 | 6/2015 | |
| EP | 2888705 | 7/2015 | |
| EP | 2888705 | 1/2016 | |
| HK | 1207190 | 1/2016 | |
| WO | 2005116896 A2 | 12/2005 | |
| WO | 2009045899 A2 | 4/2009 | |
| WO | WO-2009045899 A2 * | 4/2009 | G06Q 30/02 |
| WO | 2014035816 | 3/2014 | |

OTHER PUBLICATIONS

International Search Report and Written Opinion for PCT/US2013/056370 dated Dec. 17, 2013.
Official Communication for U.S. Appl. No. 13/455,024 dated Jul. 31, 2013.
Final Office Action dated Dec. 30, 2013, for related U.S. Appl. No. 13/455,024.
Advisory Action dated Mar. 12, 2014, for related U.S. Appl. No. 13/455,024.
Non-Final Office Action dated Jun. 13, 2014, for related U.S. Appl. No. 13/455,024.
Non-Final Office Action dated Oct. 21, 2014, for related U.S. Appl. No. 13/455,024.
Final Office Action dated Apr. 7, 2015, for related U.S. Appl. No. 13/455,024.
Extended European Search Report dated Jan. 5, 2016 for corresponding EP Patent Application No. 13833694.6.
Final Office Action dated Apr. 8, 2016 for related U.S. Appl. No. 13/455,024.
U.S. Appl. No. 13/455,024, Non Final Office Action dated Mar. 9, 2017, 22 pages.
Chinese Application No. 201380049303.6, Office Action dated May 3, 2017, 19 pages (8 pages for the original document and 11 pages for the English translation).
International Application No. PCT/US2013/056370, International Preliminary Report on Patentability dated Mar. 12, 2015, 7 pages.
U.S. Appl. No. 13/455,024, filed Apr. 24, 2012 received a Final Office Action dated Nov. 2, 2017, 24 pages.
Chinese Patent Application No. 201380049303.6, Office Action dated Apr. 13, 2018, 23 pages (10 pages for the original document and 13 pages for the English translation).
Non-final Office Action dated Sep. 21, 2015 for related U.S. Appl. No. 13/455,024.
Chinese Application No. CN201380049303.6 received an Office Action dated Jul. 18, 2018, 7 pages.
U.S. Appl. No. 13/455,024 received a Non-Final Office Action dated Oct. 5, 2018, 36 pages.

* cited by examiner

PROFILE NOISE ANONYMITY FOR MOBILE USERS

CROSS REFERENCE TO RELATED APPLICATIONS

This utility patent application is a Continuation-In-Part of U.S. patent application Ser. No. 13/455,024 filed on Apr. 24, 2012, entitled "Non-Unique Identifier For A Group Of Mobile Users," the benefit of which is claimed under 35 U.S.C. § 120 and which is incorporated herein by reference.

TECHNICAL FIELD

The present invention relates generally to managing online user data, and more particularly, but not exclusively to providing aggregated subsets of non-unique user data to user data buyers that can be employed as a basis for the targeting of online advertisement campaigns.

BACKGROUND

The online advertising industry utilizes user data to provide targeted advertising campaigns that can optimize ad placement, ad content, real-time bidding, and the like. This user data can be collected for individuals or groups of individuals, and it can include demographic data (e.g. gender, age, race), psychographic data (e.g. interests, opinions), geographic data (e.g. zip code, state, country), in-market data (e.g. users interest in luxury cars, travel to Polynesia), as well as social media data. The various types of user data are collected from multiple sources over time. Historically, grouped user data that was non-unique to an individual was often not very useful for a targeted advertising campaign. However, although individually unique user data can be significantly more useful than grouped user data for a targeted advertising campaign, the collection of such unique user data for an individual user can be invasive and the unique user data itself may intrude on the individual user's privacy rights. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
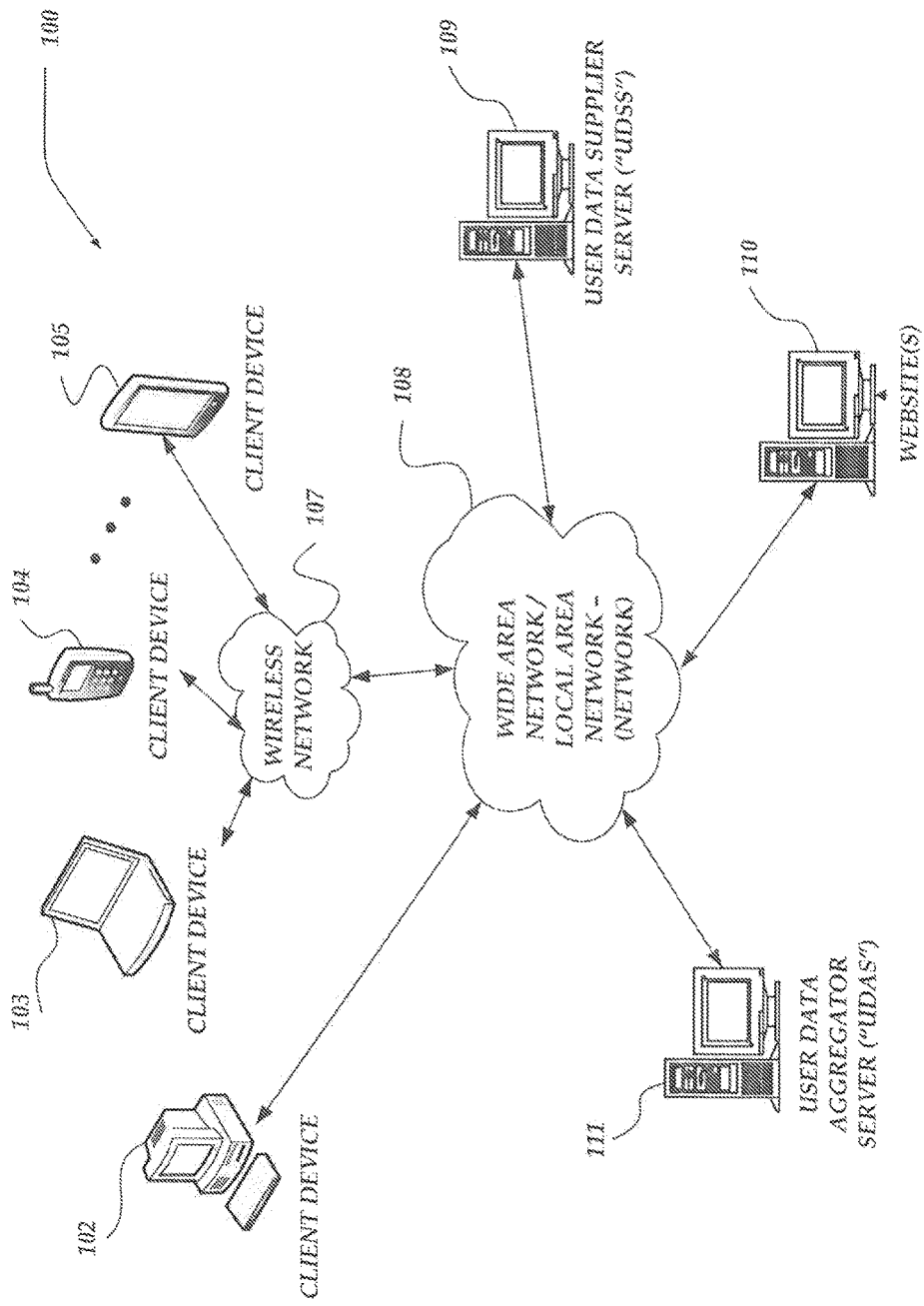
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing item the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the phrase "user data" generally refers to information about one or more users. User data may include a zip code, expanded zip code, one or more attributes, and/or any combination thereof. As used herein, the term "attribute" generally refers to a type information and/or characteristic of user data. Attributes may include, but am not limited to, age; gender; occupation; location; other demographic information; applications utilized by a user; a user's online or offline behaviors and actions; direct or indirect communications and/or predispositions towards or predilection for certain products, events, or entities; and/or direct or indirect indications of a user's affinity, inclusion or exclusion in certain groups or categories, or the like. Such online behavior may include, but is not limited to, browsing, searching, purchasing, or the like. Lack of a particular behavior and/or a negative affinity could also be used as an attribute. Attributes may also include characteristic of a device utilized by a user, such as, but not limited to, device capabilities, device identifiers, or the like.

The term attribute may also refer to campaigns seen or experienced by a user. Such campaigns may include an advertising campaign, a promotional campaign, an informational campaign, or the like. Such campaigns may be experienced by a user through online advertisements placed on web sites or other web services, including email, SMS, IM messages or the like; or other offline advertisements in virtually any medium, including but not limited to television, radio, print, physical displays, and the like.

In some embodiments, the term direct attribute may refer to attributes determined for a user based on user data provided for the user, such as, for example, by analyzing the user data. In at least one embodiment, direct attributes may also be referred to as direct behaviors. In other embodiments, the term recommended attribute may refer to attributes determined for a user independent and/or indirectly from the user data provided for the user, such as, for example, based on a mapping of attributes, attributes of other similar users, random attributes, or the like.

As used herein, the term "user data buyer" (also referred to as a "buyer") refers to any entity, individual, partnership, company, business, or the like that may buy, rent, lease, bid, and/or otherwise obtain access to aggregated user data. In one embodiment, the user data buyer may refer to an application that may want to receive user data from another application.

As used herein, the term "user data supplier" (also referred to as a "supplier") refers to any entity, individual, partnership, company, business, or the like that may collect user data and may sell, rent, lease and/or otherwise provide the collected user data to a user data aggregator. In one embodiment, the user data buyer may refer to an application that may want to share user data with another application.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to collecting, aggregating and indexing unique and non-unique user data from a plurality of users. The result for a query of this indexed aggregation of user data is provided in a plurality of sub-sets of aggregated user data. Each subset of aggregated user data corresponds to a particular portion of the plurality of users. Also, each of these particular portions of the users is set at least large enough to provide general anonymity for the individual users. Although user data may be collected in various ways, in at least one of various embodiments a plurality of third party entities may collect and provide the user data to a user data aggregator, or a user data aggregator may itself collect at least a portion of the user data. In at least one of the various embodiments, user data may be collected as unique user data, non-unique user data, and/or any combination thereof. Unique user data typically includes information that singularly identifies a user, and non-unique user data usually identifies groups of users sharing a common membership, interest, and the like.

In at least one of the various embodiments, a plurality of subsets of aggregated user data may be provided as a result for a query on a targeted behavior. In various embodiments, a query may be provided by a user data buyer, a user data aggregator, and the like. In various embodiments, subsets of user data may be aggregated based on non-unique geographic information, such as a five digit zip code, a nine digit zip code plus, neighborhood, country code, and the like, and/or any combination thereof. In at least one embodiment, each subset of aggregated user data may include a weighting that indicates its relevance to a query.

In various embodiments, the number of anonymized users in each subset of aggregated user data may be decreased or increased so long as the number of users is no smaller than a minimum amount that serves at least in part to protect the anonymity of the users. In at least one embodiment, an increased be may be charged to a user data buyer that requests search results with subsets of aggregated user data for smaller numbers of anonymized users. Also, a decreased be may be charged to the user data buyer that requests search results with subsets of aggregated user data for a larger number of anonymized users. In some embodiments, the user data buyer may utilize the search results to enable online advertising campaigns to be directed to users that are relevant to at least one targeted behavior.

In some other embodiments, a users profile may be modified to include direct attributes and/or recommended attributes. In at least one embodiment the attributes may be stored in the profile such that they are indistinguishable in the profile as to whether they are provided for the user or recommended for the user, which may add noise to the user's profile. By including recommended attributes into the user's profile, the anonymity of the user may be increased while maintaining the relevancy of the attributes to the user. In some embodiments, at least one direct attribute that corresponds to data provided for a user may be determined. In some other embodiments, at least one recommended attribute, which may be relevant to the direct attribute, may be determined. In some embodiments, the recommended attribute may be based on a mapping of attributes. In other embodiments, the recommended attribute may be based on attributes of other users that are similar to the user.

Illustrative Operating Environment

FIG. 1 shows components of one embodiment of an environment in which the invention may be practiced. Not all of the components may be required to practice the invention, and variations in the arrangement and type of the components may be made without departing from the spirit or scope of the invention.

As shown, system 100 of FIG. 1 includes local area networks ("LANs")/wide area networks ("WANs")—(network) 108, wireless network 107, client devices 102-105, user data supplier server ("UDSS") 109, and user data aggregator server ("UDAS") 111. Network 108 is in communication with and enables communication between each of the elements of system 100. Wireless network 107 further enables communication with wireless devices, such as client devices 103-105.

One embodiment of client devices 102-105 is described in more detail below in conjunction with FIG. 2. In one embodiment, at least some of client devices 102-105 may operate over a wired and/or a wireless network, such as networks 107 and 108. Generally, client devices 102-105 may include virtually any computing device capable of communicating over a network to send and receive information, including instant messages, performing various online activities, or the like. It should be recognized that more or less client devices may be included within a system such as described herein, and embodiments are therefore not constrained by the number or type of client devices employed.

Devices that may operate as client device 102 may include devices that typically connect using a wired or wireless communications medium, such as personal computers, servers, multiprocessor systems, microprocessor-based or programmable consumer electronics, network PCs, or the like. In some embodiments, client devices 102-105 may include virtually any portable computing device capable of connecting to another computing device and receiving information, such as laptop computer 103, smart phone 104, tablet computer 105, or the like. However, portable computer devices are not so limited an may also include other portable devices, such as cellular telephones, display pagers, radio frequency ("RF") devices, infrared ("IR") devices, Personal Digital Assistants ("PDAs"), handheld computers, wearable computers integrated devices combining one or more of the preceding devices, and the like. As such, client devices 102-105 typically range widely in terms of capabilities and features. Moreover, client devices 102-105 may provide access to various computing applications, including a browser, or other web-based applications.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), Hypertext Markup Language ("HTML"), eXtensible Markup Language ("XML"), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send data between another computing device. The client application may include a capability to provide send and/or receive content, or the like. The client application may further provide information that identifies itself, including a type, capability, name, or the like. In one embodiment, client device 102-105 may uniquely identify themselves through any of a variety of mechanisms, including a phone number, Mobile Identification Number ("MIN"), an electronic serial number ("ESN"), or other mobile device identifier. The information may also indicate a content format that the mobile device is enabled to employ. Such information may be provided in a network packet, or the like, sent between other client devices, UDSS 109, or other computing devices.

Client devices 102-105 may further be configured to include a client application that enables an end-user to log into an end-user account that may be managed by another computing device, such as UDSS 109, UDAS 111, or the like. Such end-user account, in one non-limiting example, may be configured to enable the end-user to manage one or more online activities, including in one non-limiting example, search activities, social networking activities, browse various websites, communicate with other users, participate in gaming, interact with various applications, or the like. However, participation in online activities may also be performed without logging into the end-user account.

Wireless network 107 is configured to couple client devices 103-105 and its components with network 108. Wireless network 107 may include any of a variety of wireless sub-networks that may further overlay stand-alone ad-hoc networks, and the like, to provide an infrastructure-oriented connection for client devices 102-105. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) generation radio access for cellular systems, WLAN, Wireless Router ("WR") mesh, and the like. Access technologies such as 2G, 3G, 4G and future access networks may enable wide area coverage for mobile devices, such as client devices 103-105 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), Wideband Code Division Multiple Access ("WCDMA"), and the like. In essence, wireless network 107 may include virtually any wireless communication mechanism by which information may travel between client devices 103-105 and another computing device, network, and the like.

Network 108 is configured to couple network devices with other computing devices, including, UDSS 109, UDAS 111, and through wireless network 107 to client devices 102-105. Network 108 is enabled to employ any form of computer readable media for communicating information from one electronic device to another. Also, network 108 can include the Internet in addition to LANs, WANs, direct connections, such as through a universal serial bus ("USB") port, other forms of computer readable media, or any combination thereof. On an interconnected set of LANs, including those based on differing architectures and protocols, a router acts as a link between LANs, enabling messages to be sent from one to another. In addition, communication links within LANs typically include twisted wire pairs or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of UDSS 109 is described in more detail below in conjunction with FIG. 3. Briefly, however, UDSS 109 includes virtually any network device usable to collect user data from client devices 102-105, websites server 110, carrier networks that provide access to wireless network 107, service providers that provide access to networks 107 and 108, and the like, and provide the collected user data to UDAS 111. In some embodiments, UDSS 109 may operate as a website server that collects user data from users that access websites hosted by UDSS 109 and/or other websites hosted by others such as website server 110. In other embodiments, UDSS 109 may operate as a server that stores data online for an application, such as, for example, a smart phone app, or the like. In at least one of the various embodiments, UDSS 109 may collect unique user data, non-unique user data, and/or any combination thereof. In at least one embodiment, UDSS 109 may provide the collected user data to UDAS 111 as aggregated user data. Devices that may be arranged to operate as UDSS 109 include various network devices, including, but not limited to personal computers, desktop computers, multiprocessor systems, microprocessor-based or programmable consumer electronics, network PCs, server devices, network appliances, and the like.

Although FIG. 1 illustrates UDSS 109 as a single computing device, the invention is not so limited. For example, one or more functions of the UDSS 109 may be distributed across one or more distinct network devices. Moreover, UDSS 109 is not limited to a particular configuration. Thus, in one embodiment, UDSS 109 may contain a plurality of network devices to collect user data from client devices 102-105. Similarly, in another embodiment, UDSS 109 may contain a plurality of network devices that operate using a master/slave approach, where one of the plurality of network devices of UDSS 109 operates to manage and/or otherwise coordinate operations of the other network devices. In other embodiments, the UDSS 109 may operate as a plurality of network devices within a cluster architecture, a peer-to-peer architecture, and/or even within a cloud architecture. Thus, the invention is not to be construed as being limited to a single environment, and other configurations, and architectures are also envisaged.

At least one embodiment of UDAS 111 is described in more detail below in conjunction with FIG. 3. Briefly, however, UDAS 111 may include virtually any network device capable of generating a plurality of aggregated subsets of non-unique user data. In some embodiments, UDAS 111 may provide plurality of subsets of aggregated user data for anonymized users to a user data buyer in a response to a query. The user data buyer may utilize the provided subsets of aggregated user data in an online advertising campaign. In at least one of the various embodiments, UDAS 111 may be configured to perform at least some of the operations of UDSS 109, such as collecting user data. Devices that may operate as UDAS 111 include various network devices, including, but not limited to personal computers, desktop computers, multiprocessor systems, microprocessor-based or programmable consumer electronics, network PCs, server devices, network appliances, and the like.

Although FIG. 1 illustrates UDAS 111 as a single computing device, the invention is not so limited. For example, one or more functions of the UDAS 111 may be distributed across one or more distinct network devices. Moreover, UDAS 111 is not limited to a particular configuration. Thus, in one embodiment, UDAS 111 may contain a plurality of network devices to aggregate user data. Similarly, in another embodiment, UDAS 111 may contain a plurality of network devices that operate using a master/slave approach, where one of the plurality of network devices of UDAS 111 operates to manage and/or otherwise coordinate operations of the other network devices. In other embodiments, the UDAS 111 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
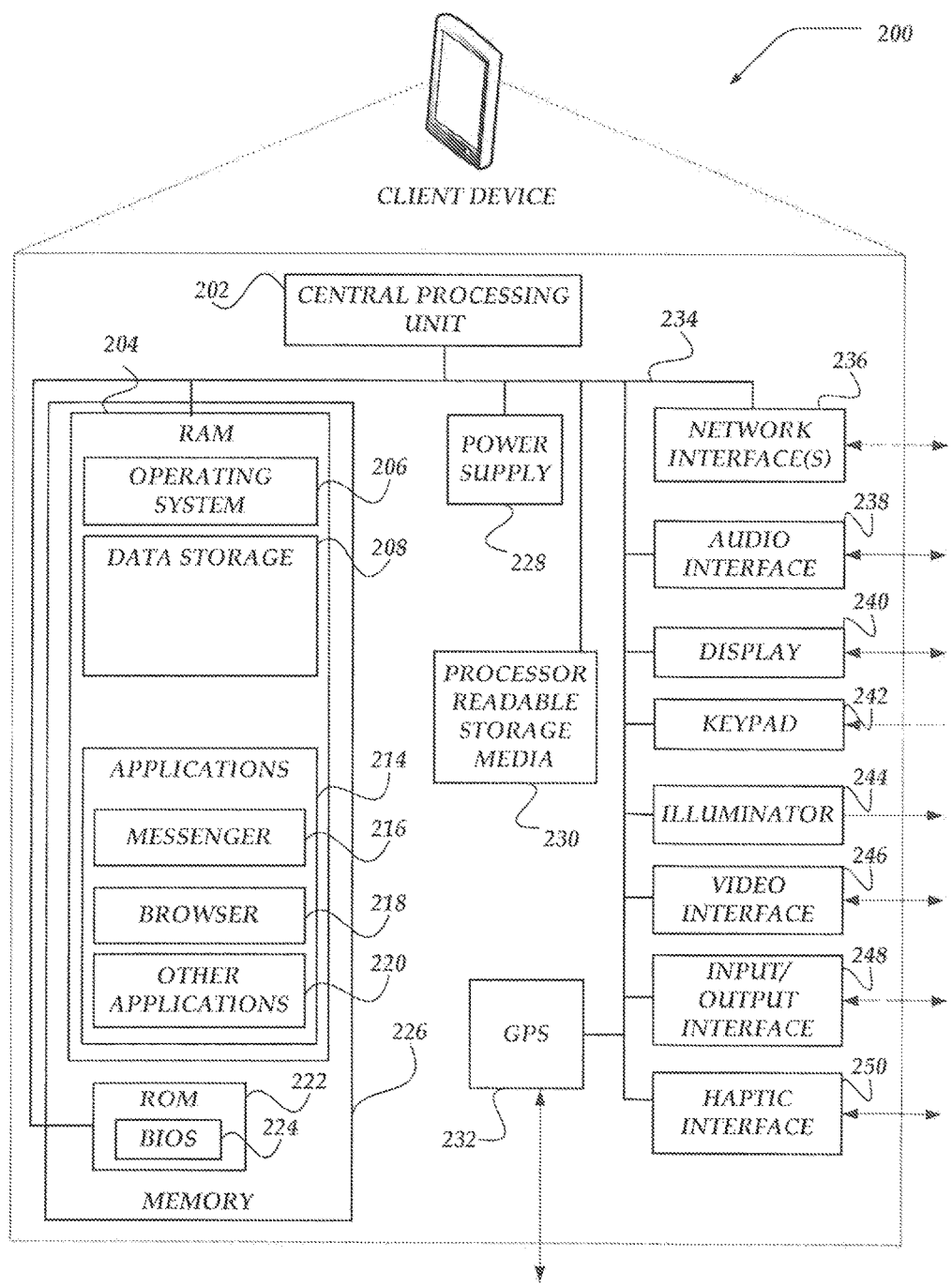
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 102-105 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, an illuminator 244, a video interface 246, an input/output interface 248, a haptic interface 250, and a global positioning system ("GPS") receiver 232.

Power supply 228 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication ("GSM"), code division multiple access ("CDMA"), time division multiple access ("TDMA"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("Wi-Max"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display ("LCD"), gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interlace 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

GPS transceiver 232 can determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store message, we page content, or any of a variety of user generated content. At least a portion of the information may also be stored on another component of network device 200, including, but not limited to processor readable storage media 230, a disk drive or other computer readable storage devices (not shown) within client device 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computing device. Processor readable storage media 230 may also be referred to herein as computer readable storage media.

Applications 214 may include computer executable instructions which, when executed by client device 200, transmit, receive, and/or otherwise process network data. Network data may include, but is not limited to, messages (e.g. SMS, Multimedia Message Service ("MMS"), instant message ("IM"), email, and/or other messages), audio, video, and enable telecommunication with another user of another client device. Applications 214 may include, for example, messenger 216, browser 218, and other applications 220. Other applications 220 may include, but are not limited to, calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. In some embodiments, other applications 220 may collect and store user data that may be provided to UDSS 109 of FIG. 1.

Messenger 216 may be configured to manage a messaging session using any of a variety of messaging communications including, but not limited to email, SMS, IM, MMS, internet relay chat ("IRC"), Microsoft IRC ("mIRC"), Really Simple Syndication ("RSS") feeds, and/or the like. For example, in one embodiment, messenger 216 may be configured as an IM application, such as AOL (America Online) Instant Messenger, Yahoo! Messenger, .NET Messenger Server, ICQ ("I seek you"), or the like. In one embodiment, messenger 216 may be configured to include a mail user agent ("MUA") such as Elm, Pine, Message Handling ("MH"), Outlook, Eudora, Mac Mail, Mozilla Thunderbird, or the like. In another embodiment, messenger 216 may be a client application that is configured to integrate and employ a variety of messaging protocols, including, but not limited to various push and/or pull mechanisms for client device 200. In one embodiment, messenger 216 may interact with browser 218 for managing messages. As used herein, the term "message" refers to any of a variety of messaging formats, or communications forms, including but not limited to email, SMS, IM, MMS, IRC, or the like.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to communicate with another network device, such as UDSS 109 and/or UDAS 111 of FIG. 1.

Illustrative Network Device

Figure 3:
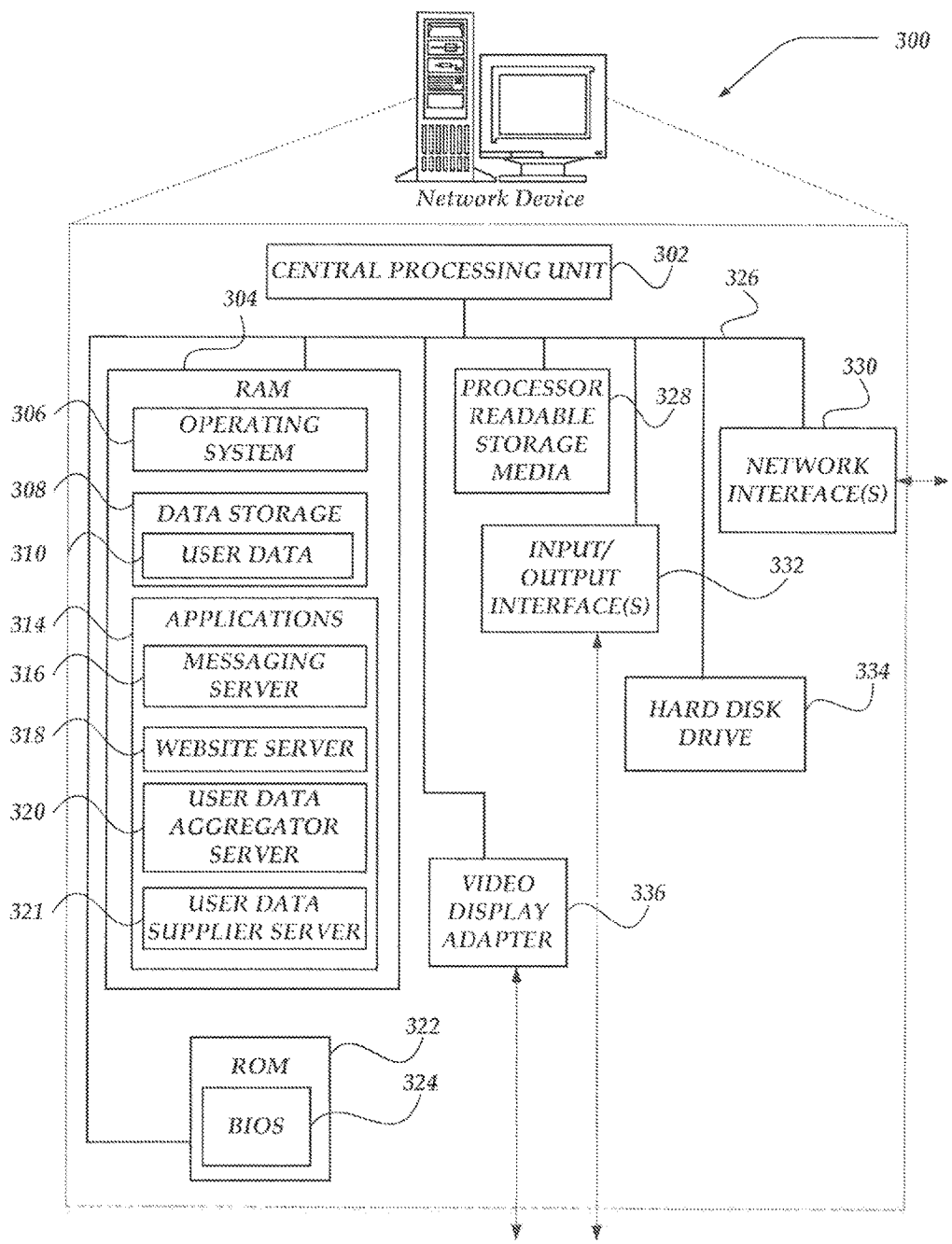
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, a host, or any other device. Network device 300 may represent, for example UDSS 109, UDAS 111 of FIG. 1, and/or other network devices.

Network device 300 includes central processing unit 302, processor readable storage media 332, network interface unit 330, an input/output interface 332, hard disk drive 334, video display adapter 336, and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network device 300. Any general-purpose operating system may be employed. Basic input/output system ("BIOS") 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card ("NIC").

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer readable media, namely computer readable storage media and/or processor readable storage media, including processor readable storage media 328. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as central processing unit 302 to execute and perform actions. In one embodiment, at least some of data storage 308 might also be stored on another component of network device 300, including, but not limited to processor-readable storage media 328, hard disk drive 334, or the like.

Data storage 308 may further store user data 310. User data 310 may store user data collected about user of client devices, such as client devices 102-105 of FIG. 1. In some embodiments, user data 310 may store unique user data, non-unique user data, aggregated user data, and/or any combination thereof. User data 310 may include a variety of attributes, such as a five digit zip code, an expanded nine digit zip code, and the like.

The mass memory may also store program code and data. One or more applications 314 may be loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Messaging server 316, website server 318, user data aggregator server 320, and/or user data supplier server 321 may also be included as application programs within applications 314.

Messaging server 316 may include virtually any computing component or components configured and arranged to forward messages from message user agents, and/or other message servers, or to deliver messages to a local message store, such as data storage 308, or the like. Thus, messaging server 316 may include a message transfer manager to communicate a message employing any of a variety of email protocols, including, but not limited, to Simple Mail Transfer Protocol ("SMTP"), Post Office Protocol ("POP"), Internet Message Access Protocol ("IMAP"), Network New Transfer Protocol ("NNTP"), or the like. Messaging server 316 may also be managed by one or more components of messaging server 316. Thus, messaging server 316 may also be configured to manage SMS messages, IM, MMS, IRC, RSS feeds, mIRC, or any of a variety of other message types. In one embodiment, messaging server 316 may enable users to initiate and/or otherwise conduct chat sessions, VOIP sessions, or the like.

Website server 318 may represent any of a variety of information and services that are configured to provide content, including messages, over a network to another computing device. Thus, website server 318 can include, for example, a web server, a File Transfer Protocol ("FTP") server, a database server, a content server, or the like. Website server 318 may provide the content including messages over the network using any of a variety of formats including, but not limited to WAP, HDML, WML, SGML, HTML, XML, Compact HTML ("cHTML"), Extensible HTML ("xHTML"), or the like. Website server 318 may also be configured to enable a user of a client device, such as client devices 102-105 of FIG. 1, to browse websites, upload user data, view and interact with advertisements, or the like.

User data aggregator server 320 is configured to aggregate user data to be provided to user data buyers for advertising campaigns. In one embodiment, user data aggregator server 320 may be configured to receive collected user data from user data supplier server 321. In some embodiments, user data aggregator server 320 may receive a query for user data. Based on the query, user data aggregator server 320 may generate a plurality of subsets of aggregated user data. In some embodiments, user data aggregator server 320 may be included in a network device, such as UDAS 111 of FIG. 1.

User data supplier server 321 is configured to collect user data. In one embodiment, user data supplier server 321 may be configured to provide the collected user data to user data aggregator server 320. In some embodiments, user data supplier server 320 may collect and/or provide unique user data and/or non-unique user data. In one embodiment, user data supplier server 320 may aggregate the collected user data. In some embodiments, user data supplier server 321 may be included in a network device, such as UDSS 109 of FIG. 1.

General Operation

Figure 4:
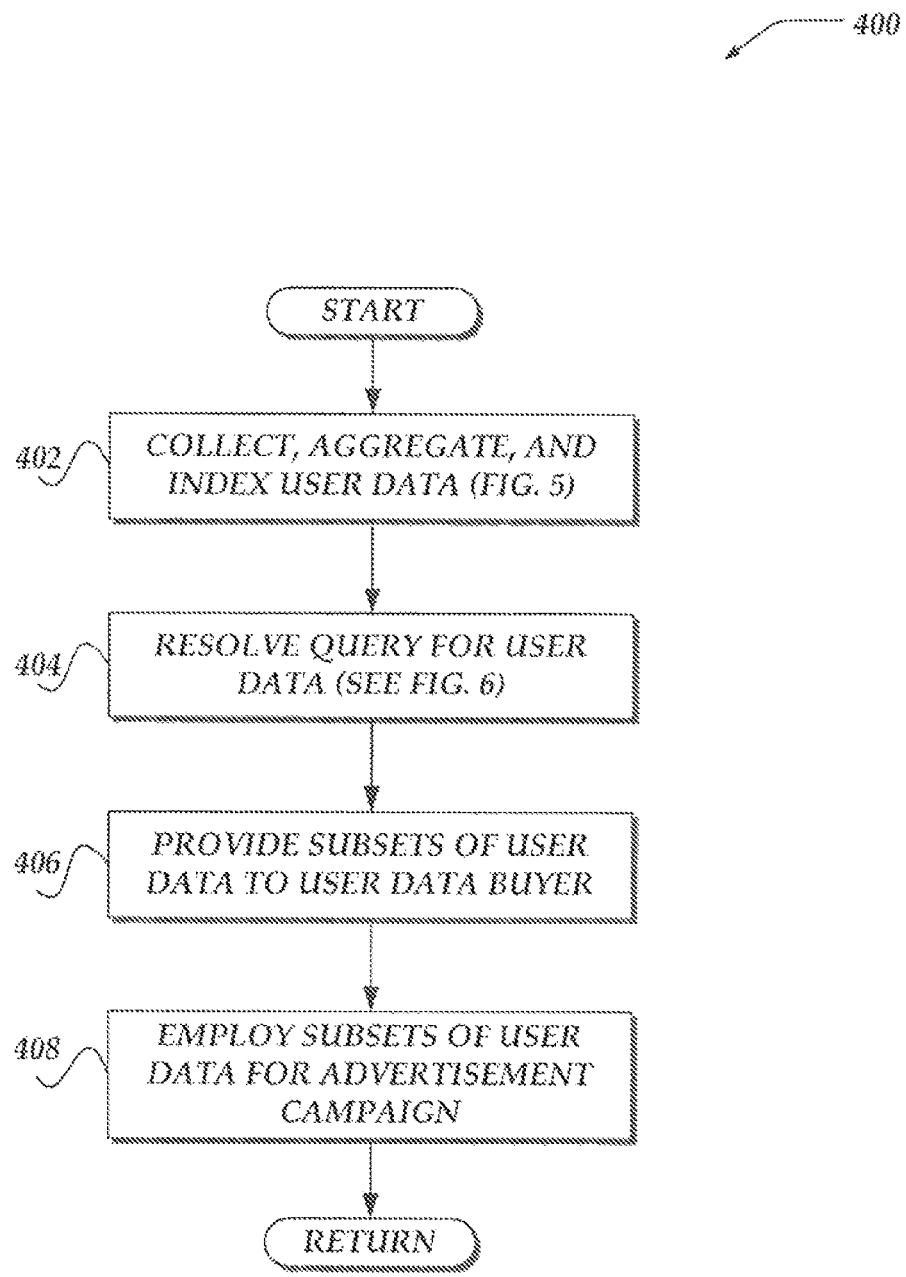
FIG. 4 illustrates a logical flow diagram generally showing one embodiment of an overview process for resolving a query for user data and providing aggregated user data to a user data buyer.

The operation of certain aspects of the invention will now be described with respect to FIGS. 4-6. FIG. 4 illustrates a logical flow diagram generally showing one embodiment of no overview process far resolving a query for user data and providing aggregated user data to the user data buyer. In some embodiments, process 400 of FIG. 4 may be implemented by and/or executed on a single network device, such as network device 300 of FIG. 3. In other embodiments, process 400 or portions of process 400 of FIG. 4 may be implemented by and/or executed on a plurality of network devices, such as network device 300 of FIG. 3.

Process 400 begins, after a start block, at block 402, which is described in more detail below in conjunction with FIG. 5. Briefly, however, at block 402, user data regarding a plurality of users may be collected, aggregated, and indexed, so that the user data may be searched. In some embodiments, user data may be collected by one or more user data suppliers, such as UDSS 109 of FIG. 1, and provided to a user data aggregator, such as UDAS 111 of FIG. 1. In other embodiments, a user data aggregator, such as UDAS 111 of FIG. 1, may itself collect at least a portion of the user data.

Process 400 next proceeds to block 404, which is described in more detail below in conjunction with FIG. 6. Briefly, however, at block 404, a query of the indexed user data is resolved and its results are provided in a plurality of subsets of aggregated user data. In some embodiments, the query may be received from a user data buyer. In other embodiments, the query may be provided by a user data aggregator. In at least one embodiment, the user data aggregator may provide pre-resolved results to queries to user data buyers. Process 400 continues at block 406, where aggregated user data may be provided to a user data buyer. In some embodiments, the aggregated user data may be provided to the user data buyer in exchange for a payment for the aggregated user data. In at least one of the various embodiments, the aggregated user data may include a plurality of aggregated subsets of non-unique user data. In at least one of the various embodiments, each aggregated subset of non-unique user data may include an identifier that uniquely identifies the subset. In one embodiment, the aggregated user data may be sold, licensed, leased, and/or otherwise provided to the user data buyer. In some embodiments, the aggregated user data may be provided to the user data buyer under predefined restrictions. Such predefined restrictions may include, but is not limited to, using the aggregated user data for a predetermined amount of time, for a specific purpose (e.g. a specific targeted advertising campaign), or the like. In one embodiment, each predefined restriction may be associated with a different amount of payment from a user data buyer.

In some embodiments, each aggregated subset of non-unique user data may include general information about the users that correspond to that subset without uniquely identifying individual users. In one non-exhaustive and non-limiting example, a subset of non-unique user data may indicate that there are 14 female users and 17 males male users; seven users are attorneys and are members of Social Media Site_1; six users like fishing, 11 users like football; one user is a teacher; and eight users use public transportation. In such an example, the subset of non-unique user data may not identify which users are both attorneys and like football, whether the teacher uses public transportation, or the like.

In other embodiments, each aggregated subset of non-unique user data may include a weight or other factor to indicate a number of users associated the subset that satisfies or is relevant to a query. For example, a query may be for female users that are attorneys in zip code 98101, aggregated by an expanded nine digit zip code. Each aggregated subset of non-unique user data may correspond to a different expanded nine digit zip code in zip code 98101 and each subset may include a weight to indicate a number of female users that are attorneys in that expanded zip code.

In one embodiment, the weight may be a value that indicates a number of users within an aggregated subset that satisfy the query. In another embodiment, each weight may correspond to a range of users. For example, a weight of zero may indicate fewer than two users satisfy the query, a weight of one may indicate that between two and five users satisfy the query, and so forth. However, the invention is not so limited and other weights may be employed singly, or in combination with other weights, scalars, formulas, and the like.

In any event, process 400 next proceeds to block 408, where the aggregated user data may be employed by a user data buyer for use in an advertising campaign. Such advertising may include, but is not limited to, targeted banner campaigns, text campaigns, sponsored search, video campaigns, direct mail, telephone marketing, or the like. However, the invention is not strictly limited to advertisements, but rather, aggregated user data may also be utilized for other purposes, such as, but not limited to website application optimization, application personalization, generic research, analytics, or the like. In one embodiment, the plurality of subsets of non-unique user data may be provided to a user data buyer for use in an online advertising campaign.

In one embodiment, a user data buyer may provide advertisements to users associated with one or more of the plurality of aggregated subsets of non-unique user data. The user data buyer may provide advertisements to users associated with an aggregated subset based on a weight of the aggregated subset. For example, a user data buyer may provide advertisements to users associated with aggregated subsets of non-unique user data that include a weight above a minimum threshold, such as, for example, 3 (assuming in this example that weights range from 0-5). However, the invention is not so limited, and the user data buyer may provide advertisements to users based on other criteria, such as, but not limited to, other attributes associated with the aggregated user data, or the like. Next, after block 408, process 400 returns to a calling process to perform other actions.

Figure 5:
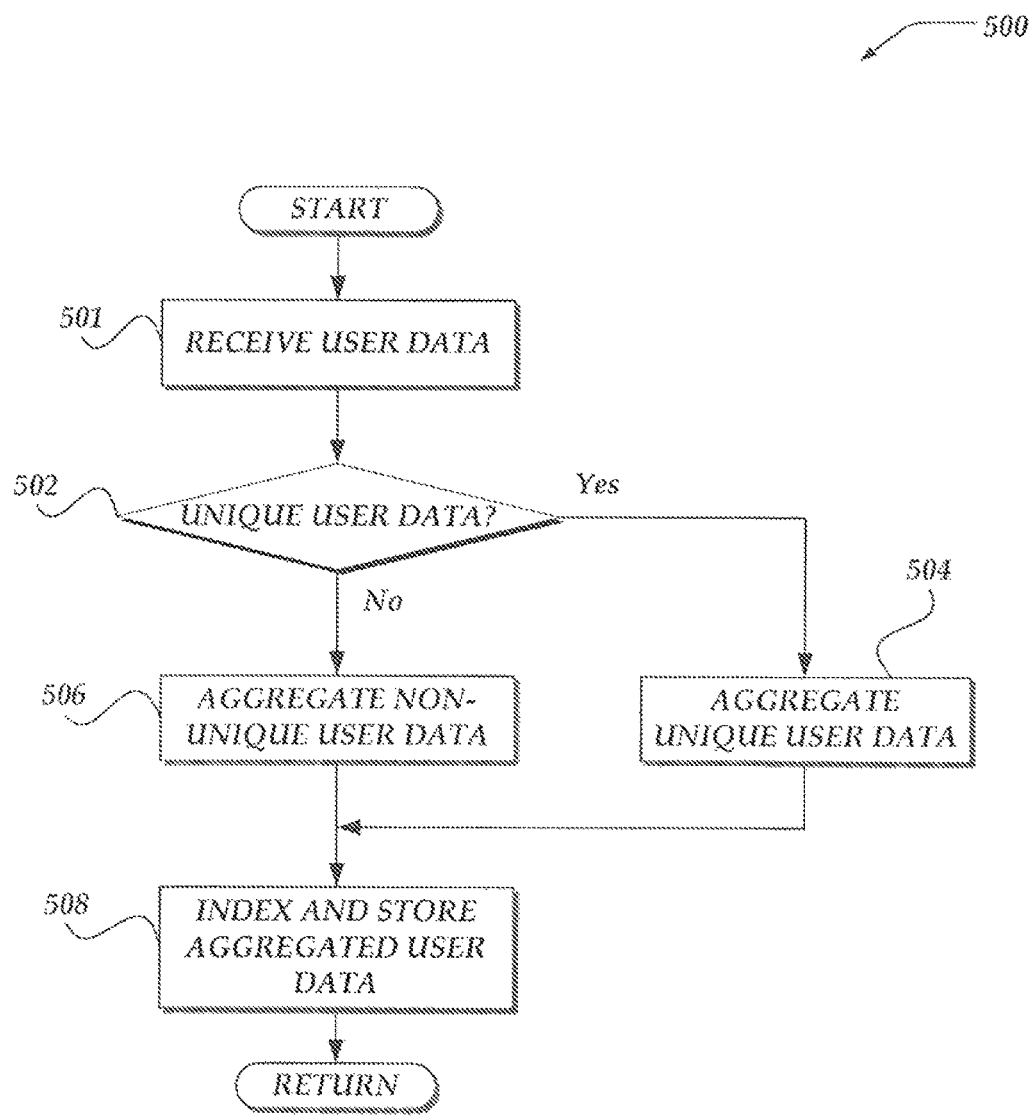
FIG. 5 illustrates a logical flow diagram generally showing one embodiment of a process for collecting and storing user data.

FIG. 5 illustrates a logical flow diagram generally showing one embodiment of a process for collecting and storing user data. In some embodiments, process 500 of FIG. 5 may be implemented by and/or executed on a single network device, such as network device 300 of FIG. 3. In other embodiments, process 500 or portions of process 500 of FIG. 5 may be implemented by and/or executed on a plurality of network devices, such as network device 300 of FIG. 3. In one embodiment, process 500 may be implemented by and/or executed by a user data supplier and/or a user data aggregator, such as UDSS 109 and/or UDAS 111 of FIG. 1, respectively.

Process 500 begins, after a start block, at block 501, where user data may be received. The received user data may include user data regarding a plurality of users. In some embodiments, user data may be directly provided by the users, such as, for example, user profile data, or the like. In other embodiments, the user data may be indirectly received from the users, such as, for example, users' interactions with websites, or the like. In some embodiments, a user may opt in and have user data collected regarding the user. In other embodiments, a user may opt out and have not user data collected regarding the user.

In some embodiments, the received user data may include unique user data, non-unique user data, and/or any combination thereof. In one embodiment, unique user data may individually identify each user associated with the unique user data. In another embodiment, the non-unique user data may identify users associated with the non-unique user data without identifying individual users. In at least one of the various embodiments, the user data may be received from one or more user data suppliers, such as UDSS 109 of FIG. 1.

Process 500 continues at decision block 502, where a determination may be made whether the received user data is unique user data. In some embodiments, user data may be unique if the user data identifies each individual user. In one embodiment, unique user data may include a personal identifier of individual users, such as, for example, a user name, social security number, email address, device identifier, or the like. In another embodiment, unique user data may not include a personal identifier, but may include a plurality of attributes that can be utilized to identify each user individually. For example, unique user data may identify: User 1 is male, age 29, who is an accountant in the zip code 98101; User 2 is male, age 34, who is a doctor in the zip code 98101; User 3 is female, age 33, who is a doctor in the zip code 98101; and so forth. In this example, the user data may be unique because each individual user is individually identified by a plurality of attributes.

In other embodiments, user data may be non-unique if the user data is for a group of users. In one embodiment, non-unique user data may identify a group of users and general attributes about the group of users, but may not uniquely identify each individual user. For example, non-unique user data may identify 20 users having an expanded zip code of 98101-1005. This non-unique user data may also include attributes about the group of users. For example, of the 20 users: six users are male and 14 users are female; two users are between the ages of 20-30 and 18 users are between the ages of 30-40; seven users are accountants, five users are doctors, and eight users are teachers. In this example, the user data may be non-unique user data because of a lack of information identifying each individual user (e.g. identifying each individual user's age, gender, and occupation).

If the user data is unique, then processing flows to block 504; otherwise, processing flows to block 506.

At block 504, the unique user data may be aggregated. In one embodiment, the unique user data may be aggregated into non-unique user data. In some embodiments, aggregating the unique user data may be optional. In at least one of the various embodiments, unique user data may be aggregated at one or more predetermined granularities. In some embodiments, the one or more predetermined granularities may be determined based on needs of user data buyers, case of resolving a query for user data, predetermined by a user data aggregator, or the like.

In some embodiments, the unique user data may be aggregated by zip code, by expanded nine digit zip code, by one or more attributes, and/or any combination thereof. Continuing the unique user data example above, in one embodiment, the unique user data may be aggregated by expanded nine digit zip code 98101-1005. In another embodiment, the unique user data may be aggregated by age and gender. However, the invention is not so limited and other attributes associated with the unique user data may be utilize to aggregate the unique user data, such as, but not limited to, websites visited, items purchased, advertisements viewed, applications utilized, social media memberships, a user's device information (e.g. a device ID (e.g. an area code), device capabilities, carrier, or the like), or the like.

In some embodiments, the unique user data may be aggregated at a plurality of different granularities. In one embodiment, the unique user data may be aggregated by zip code and separately aggregated by one or more attributes. In another embodiment, the unique user data may be aggregated by different sets of attributes. Processing then flows to block 508.

If, at decision block 502, the received user data is non-unique user data, then process 500 flows to block 506. At block 506, non-unique user data may be aggregated. In at least one of the various embodiments, non-unique user data may be aggregated similar to aggregating unique user data described at block 504. In one embodiment, non-unique user data may be aggregated by zip code, by expanded nine digit zip code, one or more common attributes, and/or any combination thereof. For example, one group of non-unique user data may include 20 female users who are between the ages of 20-30 years old, where seven users are doctors, nine users are teachers, and four users are accountants. Continuing this example, another group of non-unique user data may include 10 female users who are between the ages of 20-30 years old, where eight users play golf and two users play softball. In this example, the two groups of non-unique user data may be aggregated into one group by the common attributes of gender (female users) and age (users between 20-30 years old).

In some embodiments, non-unique user data may be aggregated at a plurality of different granularities. In one embodiment, the non-unique user data may be aggregated by zip code and separately aggregated by one or more attributes. In another embodiment, the non-unique user data may be aggregated by different sets of attributes.

In any event, process 500 continues at block 508, where the aggregated user data is stored. In some embodiments, the aggregated non-unique user data and the aggregated unique user data may be combined, indexed, and stored together in a common database. In one embodiment, the aggregated user data may be grouped and stored by zip code, expanded zip code, one or more common attributes, and/or any combination thereof. In other embodiments, the aggregated non-unique user data and the aggregated unique user data may be maintained and stored separately. In one embodiment, unique user data may not be aggregated, and may be stored by an individual user.

As described above, in at least one of the various embodiments, process 500 may be implemented by a user data supplier to collect user data. In one such embodiment, the collected user data (i.e. aggregated non-unique user data, aggregated unique user data, and/or any combination thereof) may be provided to, and stored at, a user data aggregator for use in resolving queries.

Figure 6:
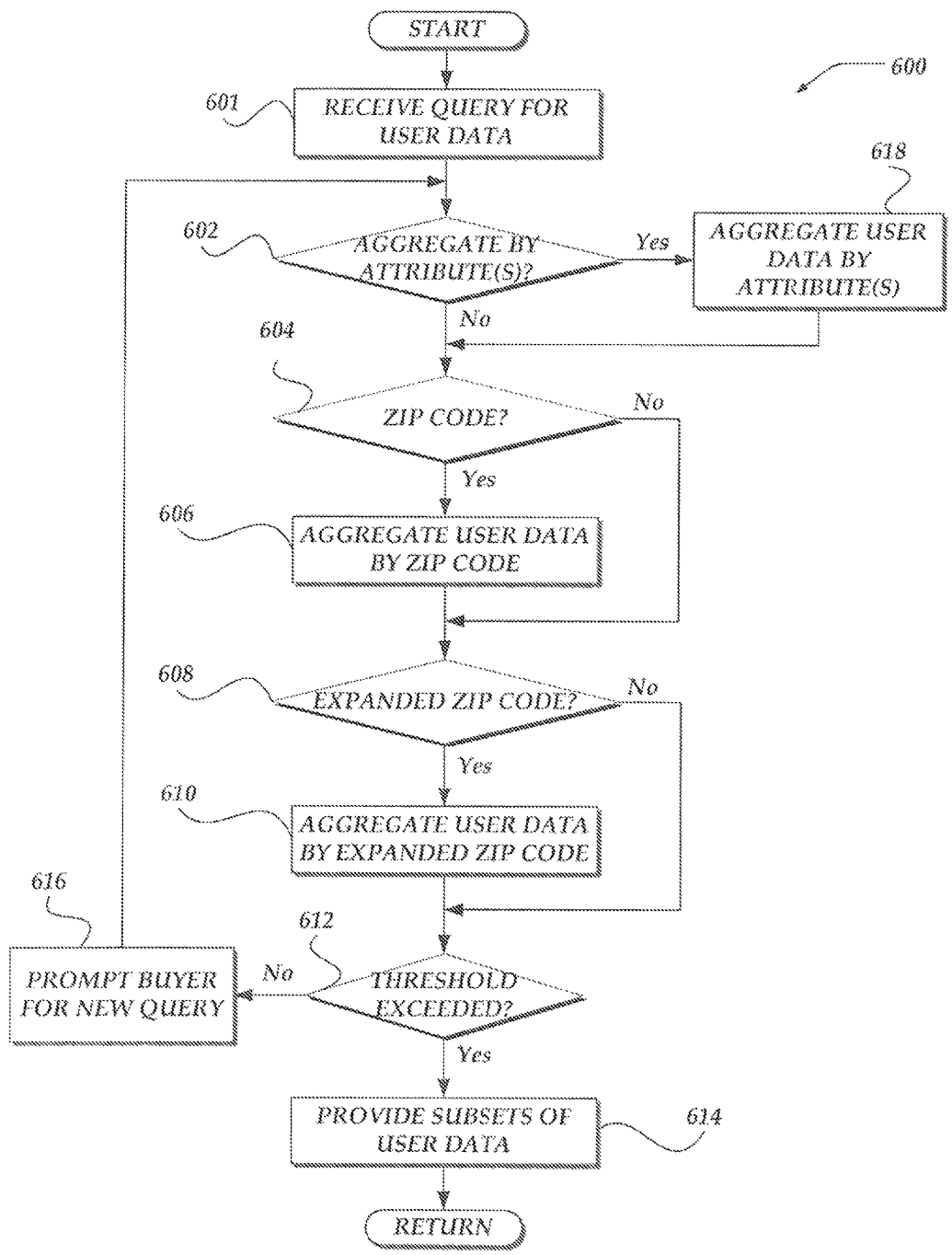
FIG. 6 illustrates a logical flow diagram generally showing one embodiment of a process for resolving a query for user data by aggregating user data to generate a plurality of subsets of non-unique user data based on the query.

FIG. 6 illustrates a logical flow diagram generally showing one embodiment of a process for resolving a query for user data by aggregating user data to generate a plurality of subsets of non-unique user data based on the query. In some embodiments, process 600 of FIG. 6 may be implemented by and/or executed on a single network device, such as network device 300 of FIG. 3. In other embodiments, process 600 or portions of process 600 of FIG. 6 may be implemented by and/or executed on a plurality of network devices, such as network device 300 of FIG. 3.

Process 600 begins, after a start block, at block 601, where a query for user data may be received. In one embodiment, the query may be received from a user data buyer. In another embodiment, the query may be determined by a user data aggregator. In some embodiments, the query may indicate a type of user data to be aggregated. In other embodiments, the query may be utilized to generate a plurality of aggregated subsets of non-unique user data. In at least one of the various embodiments, the query may include zip code, expanded nine-digit zip code, one or more attributes, and/or any combination thereof. In some embodiments, a graphical user interface may be displayed to the user data buyer to enable the user data buyer to provide the query to a user data aggregator for a subsequent search on the aggregated user data.

In at least one of the various embodiments, a user data buyer may provide a query if the user data buyer pays for aggregated user data. In some embodiments, the user data buyer may pre-purchase aggregated user data prior to providing a query. In one embodiment, the user data buyer may pay per query, pay based on a size of aggregated user data based on the query, pay per type of aggregated user data, pay for a specific use of aggregated user data, or the like.

In any event, process 600 continues at decision block 602, where a determination may be made whether the query includes one or more attributes to aggregate the user data. In some embodiments, the attributes may include generic attributes, such as, but not limited to, sports, travel interest, gender, age, or the like. In other embodiments, the attributes may include specific attributes, such as, but not limited to, male users, users that like football, or the like. In one embodiment, a query may include generic attributes and specific attributes. For example, a query may include five attributes, such as, but not limited to, male users, users that are members of Social Media Site 1, users that use Application AAAA, users that use Application BBBB, and users that enjoy football. If the user data may be aggregated by attributes, then processing flows to block 618; otherwise, processing flows to decision block 604.

At block 618, the user data may be aggregated by one or more attributes. Aggregating the user data may generate one or more subsets of non-unique user data. In one embodiment, if the query includes specific attributes, then a single group of aggregated non-unique user data may be generated based on the query. Using the example above, a single group of aggregated non-unique user data may be generated from the attributes: male users, users that are members of Social Media Site 1, users that use Application AAAA, users that use Application BBBB, and users that enjoy football. The resulting aggregated user data may indicate that of the users who satisfy the query attributes, 20 users play hockey, 31 users are teachers, 45 users are members of Social Media Site 2, and so forth.

In other embodiments, if the query includes at least one generic attribute, then a plurality of aggregated subsets of non-unique user data may be generate based on the query. For example, if a query includes the generic attribute sports, then the user data may be aggregated subsets, such as, but not limited to, hockey, football, soccer, and so forth. In one embodiment, each aggregated subset may include additional attributes about the users associated with that subset. For example, the aggregated subset for hockey may indicate that there are 15 male users, 14 female users, 5 doctors, and the like.

Processing continues at decision block 604, where a determination may be made whether the query includes a zip code. In one embodiment, the zip code may be a five digit zip code, or other location based identifier. In some embodiments, the query may include a general request for zip codes and/or a specific request for one or more specific zip codes. If the query includes a zip code, then processing flows to block 606; otherwise, processing flows to decision block 608.

At block 606, user data may be aggregated by zip code. In some embodiments, if the query includes a specific zip code, then a single group of aggregated non-unique user data may be generated based on the query. In other embodiments, if the query includes a general request for zip codes or a plurality of specific zip codes, then a plurality of aggregated subsets of non-unique user data may be generated based on the query.

In some embodiments, the user data may be aggregated into one group of aggregated user data, based on one or more attributes and then subdivided into subsets of non-unique user data based on the zip code. In other embodiments, the user data may be aggregated into one group of aggregated user data based on the zip code and then subdivided into subsets of non-unique user data based on one or more attributes.

Processing continues at decision block 608, where a determination may be made whether the query includes an expanded zip code. In one embodiment, the query may include a general request for user data aggregated by expanded zip codes. In one such embodiment, a plurality of subsets of non-unique user data may be generated, where each subset includes aggregated user data for one or more expanded zip codes. If the query includes a request for expanded zip code, then processing flows to block 610; otherwise, processing flows to decision block 612.

At block 610, user data may be aggregated by the expanded zip code. In at least one of the various embodiments, aggregating the user data by the expanded zip code may refer to combining all user data associated with a specific expanded zip code into a group without (i.e. independent of) identifying individual users. In some embodiments, the expanded zip code may be a five-digit zip code plus four additional digits, also known as ZIP+4. In one embodiment, the four additional digits may identify a subset of addresses within the five-digit zip code. However, the invention is not limited to ZIP+4 and other expanded zip codes or location based subdivision identifiers, now known or later developed, may also be employed.

In some other embodiments, the user data may be aggregated into one group of user data based on one or more attributes and/or zip codes and then subdivided into subsets of non-unique user data based on expanded zip codes. As described above, in one embodiment, each subset of non-unique user data may include a weight indicating a number of users who satisfy the query. In some other embodiments, the expanded zip code may be a non-unique identifier for the group of users associated with a corresponding subset of the aggregated user data.

For example, a query may be for male users in zip code 98101 that are attorneys, aggregated by expanded zip code. The user data may be aggregated info a single group based on male users in zip code 98101 that are attorneys. The single aggregated group may be subdivided into subsets of non-unique user data based on the expanded zip code, where each subset include a weight of a number of users that satisfy the query. As a result, 98101-1005 may have a weight of 12, 98101-1010 may have a weight of 0, 98101-1015 may have a weight of 25, and so forth. In any event, processing then flows to decision block 612.

Process 600 continues at decision block 612, where a determination is made whether each aggregated subset of non-unique user data corresponds to at least an amount of users that exceeds a threshold number of users. In some embodiments, a weight of an aggregated subset may be different than a number of users that are associated with the aggregated subset. For example, 49 users may be associated with an aggregated subset for expanded zip code 98101-1051, but the aggregated subset may have a weight of 5. In this example, a weight of 5 may indicate that of the 49 users, 5 users satisfy a received query (e.g. male users who like football).

In some embodiments, the threshold number of users may be a predefined minimum threshold. In one embodiment, the predefined minimum threshold may be based on a privacy standard, such as, in one non-limiting example, 10 users. In some embodiments, a privacy standard may refer to a minimum number of users associated with a group of aggregated non-unique user data needed to preserve anonymity for individual users. Such a privacy standard may be defined by state and/or government laws and/or regulations, a private company and/or agency, or the like.

In other embodiments, the threshold number of users may be based on an amount of money paid by a user data buyer. In some embodiment, such a threshold may be referred to as a user granularity purchase price. In one embodiment, a user data buyer may purchase, lease, rent, and/or otherwise pay an amount of money for a number of users associated with aggregated user data. In some embodiments, the threshold may be a range of users, such as, but not limited to, more than 20 users, between 20 and 100 users, or the like.

In some embodiments, the threshold may correspond to a number of users associated with the aggregated user data as a whole. In other embodiments, the threshold may correspond to a number of users associated with each aggregated subset of non-unique user data. For example, a first price may be fixed for aggregated subsets that correspond to more than 10 users, a second price may be fixed for aggregated subsets that correspond to more than 20 users, a third price may be fixed for aggregated subsets that correspond to more than 100 users, and so forth.

If each aggregated subset of non-unique user data corresponds to at least an amount of users that exceeds a threshold number of users, then processing flows to block 614; otherwise, processing flows to block 616. In one embodiment, if a subset of the aggregated subsets of non-unique user data corresponds to at least an amount of users that exceeds the threshold, then processing may flow to block 614 for the subset of aggregated subsets that corresponds to at least an amount of users that exceeds the threshold. Although not shown, the threshold can be increased or decreased depending upon the requested granularity, i.e., the maximum number of anonymized users that can correspond to each subset of aggregated user data. However, a minimum threshold number of anonymized users is maintained to protect the privacy and anonymity of the users associated with each subset of aggregated user data.

At block 616, the user data buyer may be prompted to input a new query. In some embodiments, the user data buyer may provide one or more new and/or additional attributes, another zip code, an expanded nine digit zip code, or the like, and/or any combination thereof. In one embodiment, if an initial query was determined by a user data aggregator, then the user data aggregator may determine a new query. Process 600 then loops to decision block 602.

If, at decision block 612, each aggregated subset of non-unique user data-corresponds to at least an amount of users that exceeds a selectable threshold number of users, then processing flows to block 614. At block 614, the aggregated user data may be provided to the user data buyer. In some embodiments, block 614 may employ embodiments of block 406 of FIG. 4 to provide aggregated user data to the user data buyer. After block 614, process 600 returns to a calling process to perform other actions.

Figure 7:
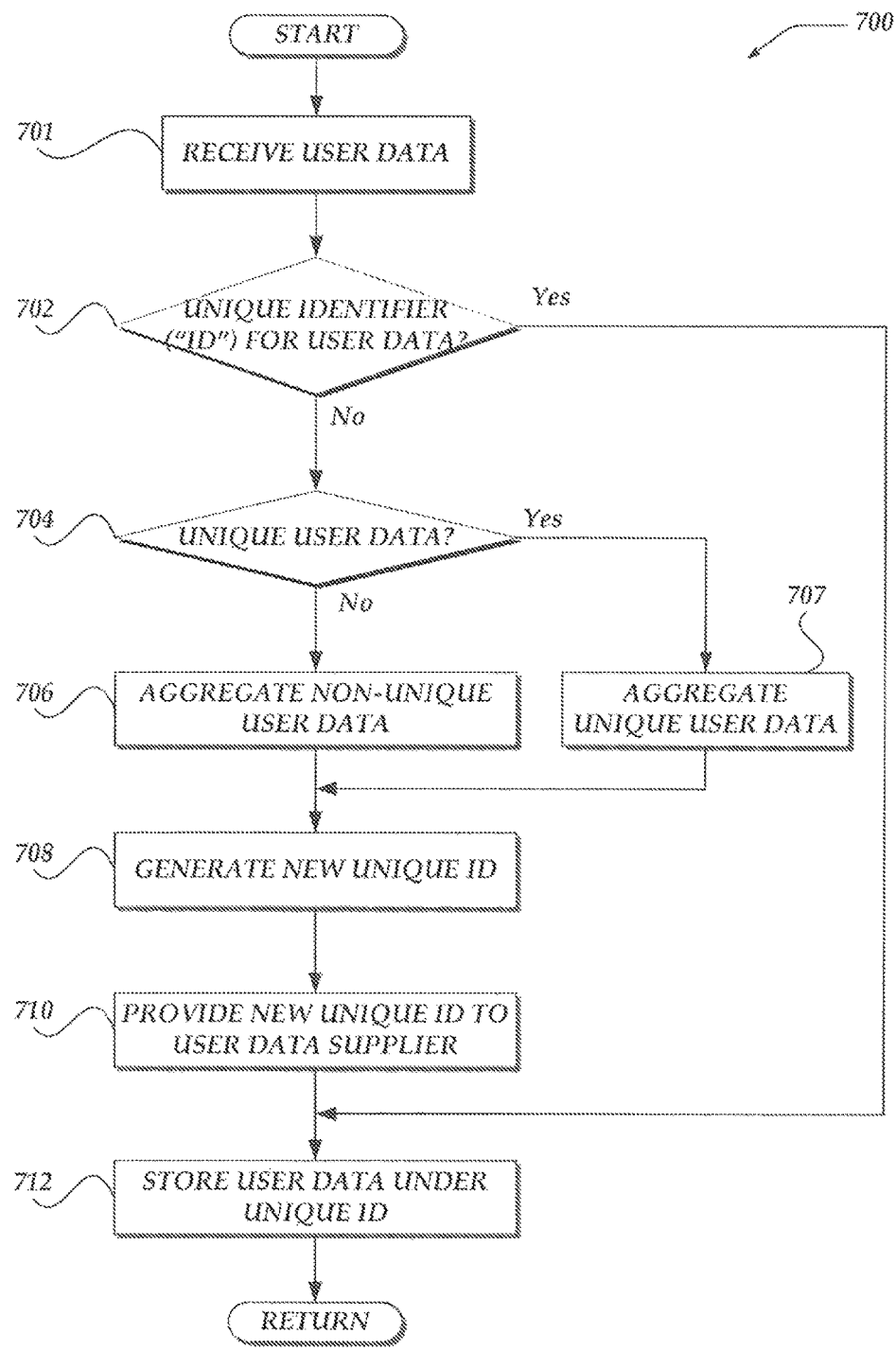
FIG. 7 illustrates a logical flow diagram generally showing an alternative embodiment of a process for collecting and storing user data.

FIG. 7 illustrates a logical flow diagram, generally showing one alternative embodiment of a process for collecting and storing user data. In some embodiments, process 700 of FIG. 7 may be implemented by and/or executed on a single network device, such as network device 300 of FIG. 3. In other embodiments, process 700 or portions of process 700 of FIG. 7 may be implemented by and/or executed on a plurality of network devices, such as network device 300 of FIG. 3.

Process 700 begins, after a start block, at block 701, where user data may be received. In one embodiment, block 701 may employ embodiments of block 501 of FIG. 5 to receive user data.

Process 700 proceeds to decision block 702, were a determination may be made whether the received user data includes a unique identifier ("ID") for the user data. The unique ID may be generated by a user data aggregator, such as UDAS 111 of FIG. 1 and provided to user data suppliers, such as UDSS 109 of FIG. 1. In some embodiments, UDSS 109 of FIG. 1 may include unique IDs when providing user data to UDAS 111 of FIG. 1. In at least one of the various embodiments, unique user data, non-unique user data, aggregated unique user data, aggregated non-unique user data, and/or any combination thereof may be associated with one or more unique ID (e.g. user data from expanded nine digit zip code 98101-1001 may be associated with a first unique ID and may also be associated with a second unique ID for zip code 98101).

In some embodiments, user data may include a unique ID based on a zip code, expanded nine digit zip code, and/or one or more attributes. For example, user data for a male user of Application One from zip code 98101 may be associated with first unique ID and user data for a female user of Application One from zip code 03301 may be associated with a second unique ID. In yet another example, user data for users of Application one may be associated with a third unique ID.

If the received user data includes a unique ID, then processing flows to block 712; otherwise, processing flows to decision block 704.

At decision block 704, a determination may be made whether the received user data is unique user data. In at least one of the various embodiments, block 704 may employ embodiments of block 502 of FIG. 5 to determine whether the received user data is unique user data. If the received user data is unique user data, then processing flows to block 707; otherwise, processing flows to block 706.

At block 707, the unique user data may be aggregated. In at least one of the various embodiments, block 707 may employ embodiments of block 504 of FIG. 5 to aggregate the unique user data. Processing then flows to block 708.

If, at decision block 704, it is determined that the received user data is not unique user data, then processing flows to block 706, where non-unique user data may be aggregated. In at least one of the various embodiments, block 706 may employ embodiments of block 506 of FIG. 5 to aggregate then non-unique user data.

Process 700 continues at block 708, where a new unique ID is generated for the aggregated user data. In at least one of the various embodiments, the new unique ID may be generated based on a zip code, expanded nine digit zip code, unique combination of one or more attributes, and/or any combination thereof. In some embodiments, a plurality of new unique IDs may be generated for the aggregated user data, where each new unique ID is based on a different combination of attributes, zip code, and/or expanded nine digit zip code.

Continuing to block 710, the new unique ID may be provided to the user data supplier. In some embodiments, the new unique ID may be provided to the user data supplier, such as UDSS 109, by email, or the like.

Proceeding to block 712, the user data may be stored under the unique ID. In one embodiment, block 712 may employ embodiments of block 508 of FIG. 5 to store user data. In some embodiments, the unique ID may be utilized to match user data from one user data supplier to user data from another user data supplier. For example, a first user data supplier and a second user data supplier may provide user data for users of zip code 98101 under a same unique ID. After block 712, processing returns to a calling process to perform other actions.

Figure 8:
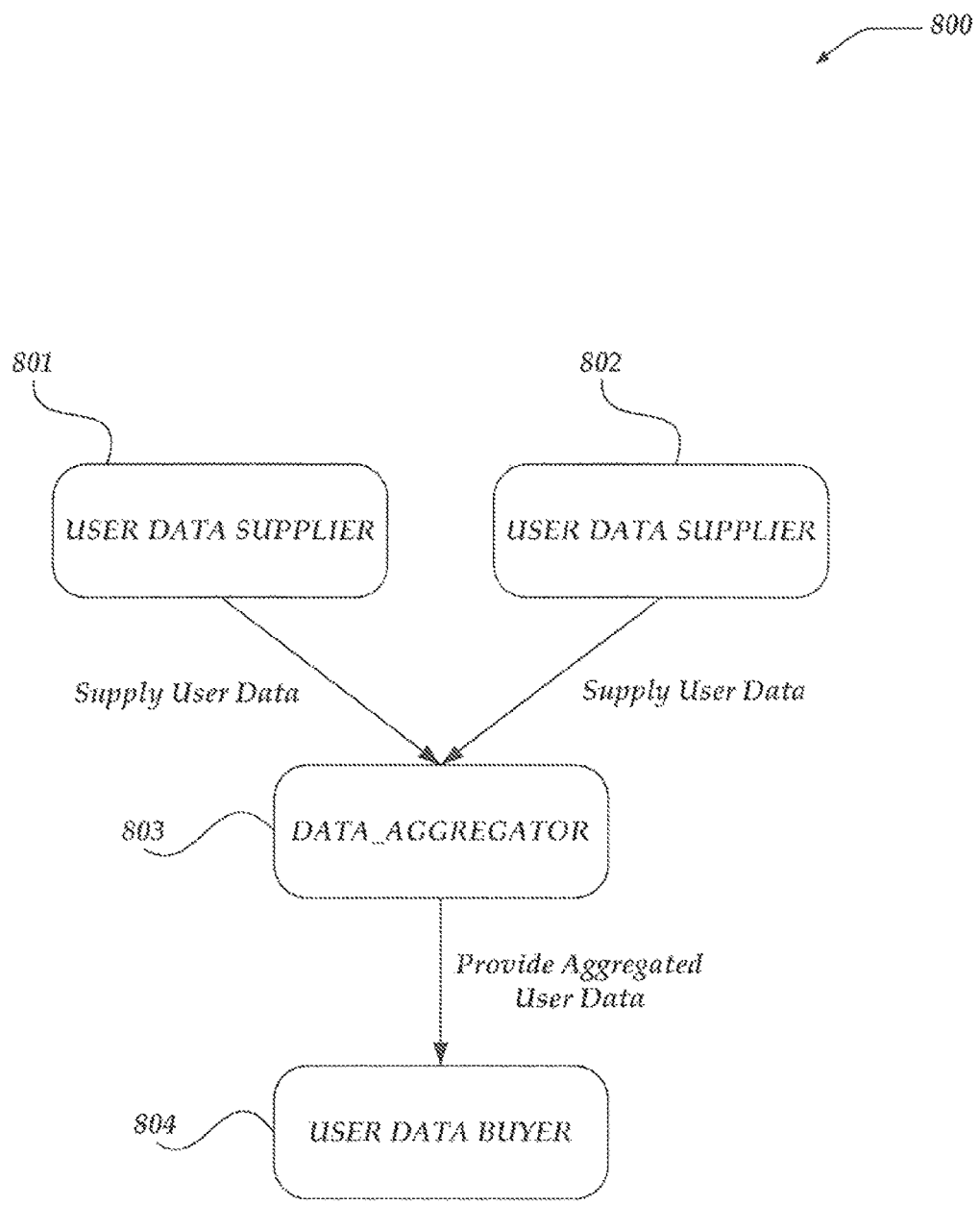
FIG. 8 shows one embodiment of a use case illustrating a system diagram of a system that may be utilized to collect user data from user data suppliers and provide aggregated user data to a user data buyer.

FIG. 8 shows one embodiment of a use case illustrating a system diagram of a system that may be utilized to collect user data from user data suppliers and provide aggregated user data to a user data buyer. System 800 may include User Data Supplier 801, User Data Supplier 802, User Data Aggregator 803, and User Data Buyer 804. User Data Suppliers 801 and 802 may be user data suppliers, such as UDSS 109 of FIG. 1. User Data Aggregator 803 may be a user data aggregator, such as UDAS 111 of FIG. 1.

User Data Aggregator 803 may collect user data from User Data Supplier 801 and User Data Supplier 802 and provide aggregated user data to User Data Buyer 804.

User Data Supplier 801 may provide User Data Aggregator 803 with the following example of user data about users that utilize "Application One": there are 100 male users from zip code 98101, of which 70 users like fishing and 60 users like football. User Data Supplier 802 may provide User Data Aggregator 803 the following example of user data about users that utilize "Application Two": there are 40 male users from zip code 98101, of which 25 are teachers.

User Data Aggregator 803 may collect and store the user data from User Data Suppliers 801 and 802. User Data Aggregator 803 may receive a query for user data from User Data Buyer 804. In one non-limiting example, the query may be for male users from zip code 98101, aggregated by an expanded nine digit zip code. User Data Aggregator 803 may utilize the query to aggregate the user data received from User Data Suppliers 801 and 802 into a plurality of aggregated subsets of non-unique user data, such as by using process 600 of FIG. 6. For example, subset_1 for expanded zip code 98101-1005 may indicate 7 male users like fishing, 6 male users like football, and 2 male users are teachers, subset_2 for expanded zip code 98101-1010 may indicate 2 male users like soccer and 3 male users like football, and so forth.

User Data Aggregator 803 may provide the plurality of aggregated subsets of non-unique user data to User Data Buyer 804, if each of the aggregated subsets corresponds to at least an amount of users that exceeds a predefined minimum threshold (e.g. 10 users).

User Data Buyer 804 may utilize the aggregated user data to provide advertisements to users. For example, User Data Buyer 804 may provide fishing advertisements to users associated with subset_1, but not subset_2. In another example, User Data Buyer 804 may provide advertisements, (e.g. fishing, soccer, football and/or teacher related advertisements) to male users from zip code 98101 that utilize "Application Three".

Profile Noise Anonymity

Figure 9:
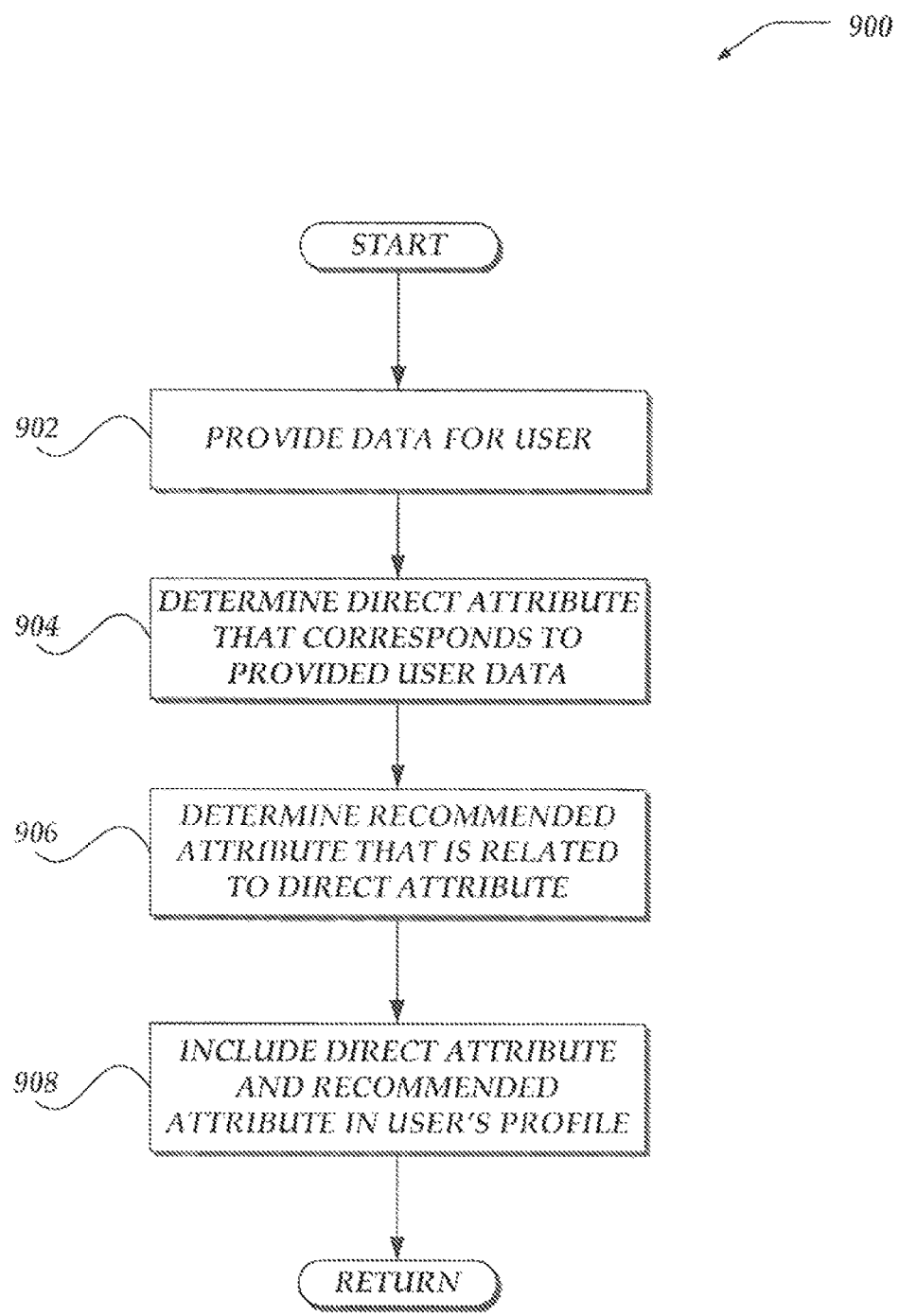
FIG. 9 illustrates a logical flow diagram generally showing one embodiment of an overview process for determining direct and/or recommended attributes and including them in a user's profile.

The operation of certain aspects of the invention will now be described with respect to FIGS. 9-12. FIG. 9 illustrates a logical flow diagram generally showing one embodiment of an overview process for determining direct and/or recommended attributes and including them in a user's profile. In some embodiments, process 900 of FIG. 9 may be implemented by and/or executed on a single network device, such as network device 300 of FIG. 3. In other embodiments, process 900 or portions of process 900 of FIG. 9 may be implemented by and/or executed on a plurality of network devices, such as network device 300 of FIG. 3. In some embodiments, process 900 may be performed for each of a plurality of users when data is provided for a user (which may, in some embodiments, be referred to as a target user).

Process 900 begins, after a start block, at block 902, where data for a user may be provided. In some embodiments, the user data may be provided by a user, such as with a mobile device and/or other network device. In at least one embodiment, the network device may be known, such that the user data may be provided from a network device that corresponds to the user's profile. In some other embodiments, the user data may be provided by a third party entity that collects and/or provides the user data, such as, for example, a user data supplier.

Process 900 continues at block 904, where at least one direct attribute that corresponds to the user data may be determined. For example, if a user searches for Seattle Seahawks football tickets, one or more direct attributes may be determined, including, but not limited to, the user likes football, the user lives in Seattle, the user purchases sports tickets online, or the like.

Direct attributes may be determined from the provided user data based on any of a number of different analytic tools and/or algorithms, including, but not limited to, categorization tools, classification tools, analysis tools, or the like, or any combination, thereof. In some embodiments, direct attributes may be determined by employing these tools/algorithms to determine a type of user data, keywords in the user data, or the like.

In at least one embodiment, one or more keywords within and/or associated with the user data may be identified. In at least one embodiment, the keywords may be employed as the direct attribute. For example, if a user searches for flowers, the keyword "flowers" may be identified and utilized as the direct attribute. In another embodiment, the keywords may be employed to select one or more direct attributes from a list of attributes. The list of attributes may be static and/or dynamic. In one embodiment, the list of attributes may be predetermined by an operator and/or predetermined based on a sample set of attributes. In another embodiment, the list of attributes may dynamically change over time based on user data provided from a plurality of users.

In any event, process 900 proceeds to block 906, where at least one recommended attribute may be determined. In some embodiments, the recommended attribute may be related to and/or associated with the direct attribute, which is described in more detail below in conjunction with FIGS. 10 and 12. Briefly, however, in one embodiment, the recommended attribute may be determined based on a mapping between a plurality of attributes for a plurality of users by employing the direct attribute (as determined at block 904) to select a mapped recommended attribute. In another embodiment, the recommended attribute may be determined based on attributes of other users that may be characterized similar to the user of the provided data. In other embodiments, the recommended attribute may be a random attribute. In at least one such embodiment, a random attribute generated may be employed to determine the at least one recommended attribute.

Process 900 continues next to block 908, where the at least one direct attribute and the at least one recommended attribute may be included in a profile of the user. In at least one embodiment, the direct attribute and the recommended attribute may be stored in the profile such that they are indistinguishable in the profile as to whether they were provide for the user or recommended for the user. In some embodiments, the attributes may be stored in the profile without any tags, labels, descriptors, and/or other identifiers that may indicate where and/or how the attribute was obtained (i.e., provided or recommended). Accordingly, one who views the profile may not be able to deduce which attributes are direct and which are recommended. For example, after a user searches for Seattle Seahawk football tickets, the user's profile may include the attributes: the user likes football, the user likes the Seattle Seahawks, lives in Seattle, the user likes the Seattle Mariners baseball team, the user purchased a grill, and the user buys sport memorabilia. However, the profile may exclude an indication as to which attributes are direct attributes and which attributes are recommended attributes.

In some embodiments, at least a portion of profiles of one or more users may be provided to a user data buyer, such as described in more detail above in conjunction with FIG. 4. Briefly, however, a user data buyer may provide a query for relevant user attributes. A plurality of users may be determined based on the query. In at least one embodiment, the plurality of users may be determined based on a comparison of the query with attributes in the users profiles, employing embodiments as described above, or the like. A result of the query may be provided to the user data buyer. In some embodiments, the result may include at least a portion of the profile of each of the plurality of users determined based on the query. In at least one embodiment, the portion of the profile of each of the plurality of users (i.e., the results) may be used in an online advertising campaign.

In any event, alter block 908, process 909 may return to a calling process to perform other actions. In some other embodiments, process 900 may loop (not shown) to block 902 to provide additional data for the user (and to determine and include additional direct attributes and/or recommended attributes in the user's profile).

Figure 10:
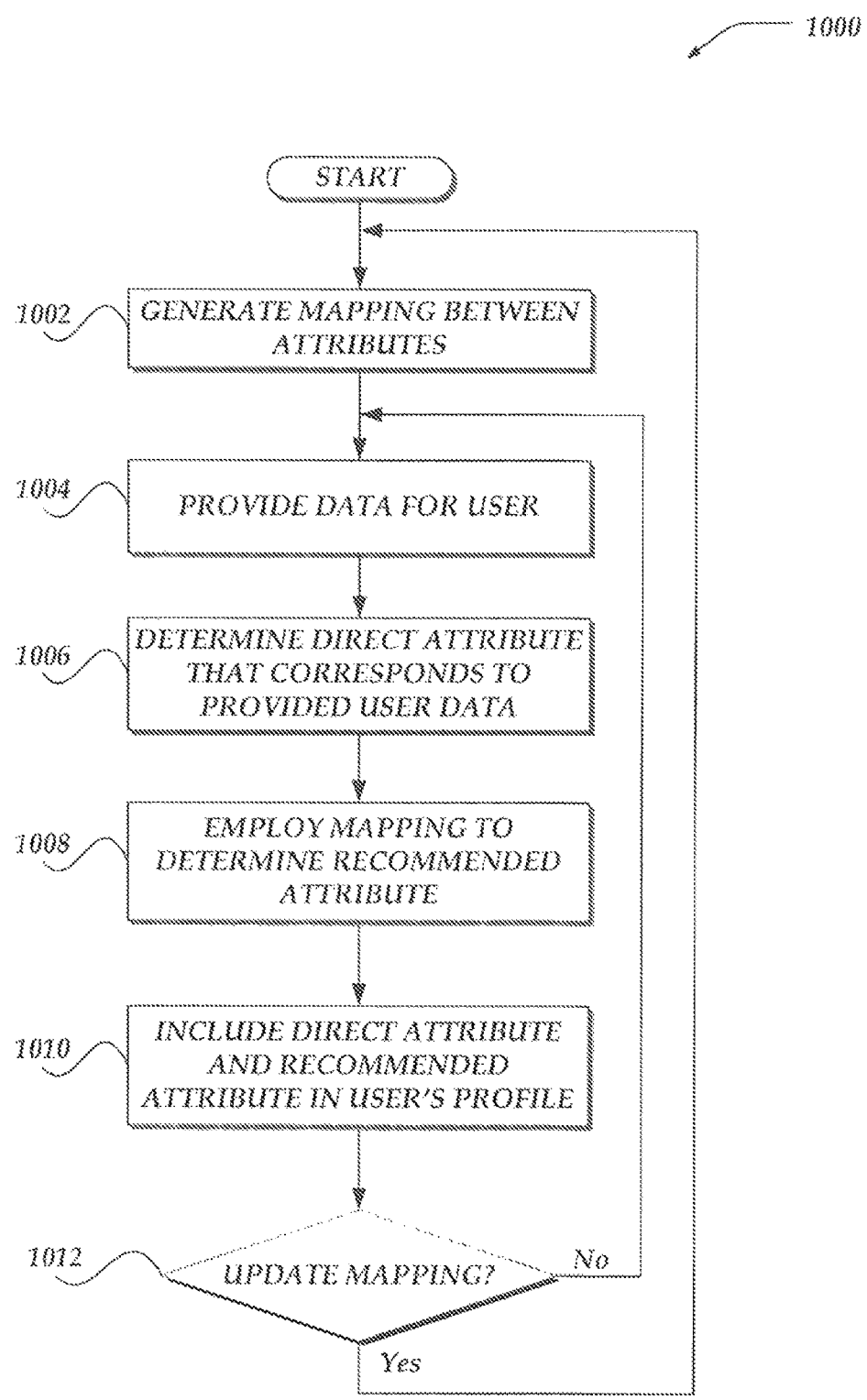
FIG. 10 illustrates a logical flow diagram generally showing one embodiment of a process for determining recommended attributes based on a mapping between attributes.

FIG. 10 illustrates a logical flow diagram generally showing one embodiment of a process for determining recommended attributes based on a mapping between attributes. In some embodiments, process 1000 of FIG. 10 may be implemented by and/or executed on a single network device, such as network device 300 of FIG. 3. In other embodiments, process 1000 or portions of process 1000 of FIG. 10 may be implemented by and/or executed on a plurality of network devices, such as network device 300 of FIG. 3.

Process 1000 begins, after a start block, at block 1002, which is described in more detail below in conjunction with FIG. 11. Briefly, however, at block 1002, a mapping between a plurality of attributes may be generated. In at least one embodiment, the mapping may be between a plurality of attributes for a plurality of users having a determined degree of separation. In some embodiments, a table, or other suitable data structure, may be utilized to map attributes to each other. An embodiment of a use case illustration of a mapping between a plurality of attributes is described in more detail below in conjunction with FIG. 13.

In some embodiments, the mapping may be a generic mapping for all users. In other embodiments, different subsets (i.e., groups) of users may be associated with different mappings. For example, users in New York City may be associated with one mapping, while users in Seattle, Wash. may be associated with a different mapping. In some embodiments, employing different mappings may enable more relevant recommended attributes to be determined for a user compared to a generic mapping that applies to all users. For example, users in New York City may be more likely to buy basketball tickets if they buy football tickets compared to users in Seattle, since Seattle does not have a basketball team. However, embodiments are not so limited and virtually any suitable number of mappings and/or groupings of users may be employed.

In any event, process 1000 continues at block 1004, where data for a user may be provided. In at least one embodiment, block 1004 may employ embodiments of block 902 of FIG. 9 to provide user data.

Process 1000 proceeds next to block 1006, where at least one direct attribute may be determined that corresponds to the user data. In at least one embodiment, block 1006 may employ embodiments of block 904 of FIG. 9 to determine at least one direct attribute.

Process 1000 continues next at block 1008, where the mapping of attributes (as generated at block 1002) may be employed to determine at least one recommended attribute. In at least one embodiment, the at least one recommended attribute may correspond and/or map to the at least one direct attribute determined at block 1006. For example, if the attribute "flowers" maps to the attribute "chocolate" and a determined direct attribute for a user is "flowers," then a recommended attribute for the user may be "chocolate".

Process 1000 proceeds to block 1010, where the at least one direct attribute and the at least one recommended attribute may be included in a profile of the user. In at least one embodiment, block 1010 may employ embodiments of block 908 of FIG. 9 to include attributes in the user's profile.

Process 1000 continues at decision block 1012, where a determination may be made whether the mapping may be updated. In some embodiments, this determination may be based on a selection (e.g., by an operator) to dynamically change the attribute mapping. In at least one embodiment, the mapping may be updated to include a mapping between the recommended attribute and other attributes in the user's profile and/or between the direct attribute and the other attributes in the user's profile.

For example, assume the system determines a direct attribute of "chocolate" and a recommended attribute of "rents limousines." Also, assume the user's profile includes the attribute the "flowers." In this example, the mapping may be updated to include a link between the attributes chocolate and flowers and a link between the attributes rents limousines and flowers.

If the attribute mapping may be updated, then process 1000 may loop to block 1002; otherwise, process 1000 may loop to block 1004.

Figure 11:
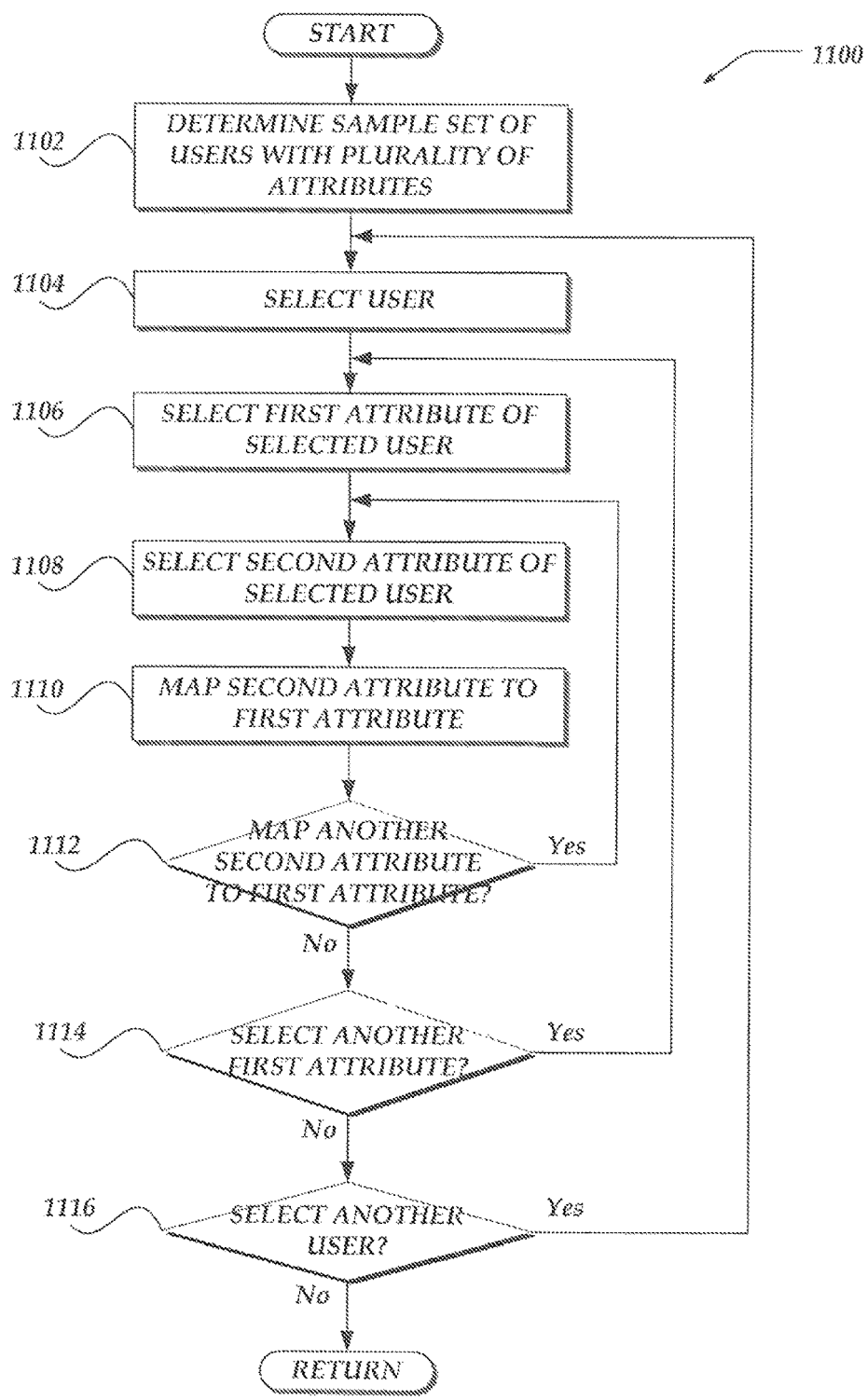
FIG. 11 illustrates a logical flow diagram generally showing one embodiment of a process for generating a mapping between a plurality of attributes.

FIG. 11 illustrates a logical flow diagram generally showing one embodiment of a process for generating a mapping between a plurality of attributes. In some embodiments, process 1100 of FIG. 11 may be implemented by and/or executed on a single network device, such as network device 300 of FIG. 3. In other embodiments, process 1100 or portions of process 1100 of FIG. 11 may be implemented by and/or executed on a plurality of network devices, such as network device 300 of FIG. 3.

Process 1100 begins, after a start block, at block 1102, where a sample set of users may be determined. Each of the users in the sample set may have a corresponding profile that may include a plurality of attributes. In at least one embodiment, the sample set of users may be a random subset of all users in the system. In another embodiment, the sample set of users may be a predetermined set of users. In some other embodiments, the sample set of users may be a set of users with profiles that each includes a minimum number of same attributes.

Process 1100 proceeds to block 1104, where a user from the sample set of users may be selected. In some embodiments, the user may be randomly selected, selected in a predetermined order, or the like.

Process 1100 continues next to block 1106, where a first attribute of the selected user may be selected. In some embodiments, the first attribute may be randomly selected, selected in a predetermined order (e.g., alphabetically, by attribute identifier, or the like), or the like.

Process 1100 proceeds next to block 1108, where a second attribute of the selected user may be selected. In some embodiments, the second attribute may be randomly selected, selected in a predetermined order (e.g., alphabetically, by attribute identifier, or the like), or the like. In other embodiments, the second attribute may be selected based on a schema to map each attribute in a user's profile to each other attribute in the user's profile.

In at least one of various embodiments, the second attribute may be selected based on a category of the first attribute and a category of the second attribute. For example, if the first attribute is categorized as "sports," then an attribute of the selected user that is also categorized as "sports" may be selected as the second attribute. In some embodiments, each attribute may be grouped into one or more categories (and/or subcategories) of attributes. In one non-limiting, non-exhaustive example, attributes may be categorized as sports, health and beauty, travel, or the like.

In at least one embodiment, by employing categories (and/or subcategories) of attributes, the system may increase the mappings between related attributes, while reducing the mappings of unrelated attributes. In at least one embodiment, each attribute may be associated with one or more categories.

Continuing to block 1110, the second attribute may be mapped to the first attribute. In at least one of various embodiments, mapping the second attribute to the first attribute may include linking the two attributes, such as in an attribute mapping table or other suitable data structure. In some embodiments (not shown in FIG. 11), more than two attributes may be mapped together.

In any event, process 1100 proceeds to decision block 1112, where a determination may be made whether to map another second attribute to the first attribute. In some embodiments, this determination may be made based on a number of attributes associated with the selected user's profile. In at least one embodiment, second attributes may continually be selected until the first attribute is mapped to each other attribute in the selected user's profile. If another second attribute may be mapped to the first attribute, then process 1100 may loop to block 1108 to select another second attribute; otherwise, process 1100 may flow to decision block 1114.

At decision block 1114, a determination may be made whether to select another first attribute. In some embodiments, this determination may be made based on a number of attributes associated with the selected user's profile. In at least one embodiment, first attributes may continually be selected until each attribute in the selected user's profile is mapped to each other attribute in the selected user's profile. If another first attribute may be selected, then process 1114 may loop to block 1106 to select another first attribute; otherwise, process 1100 may flow to decision block 1116.

At decision block 1116, a determination may be made whether to select another user to map attributes. In at least one embodiment, another user may be selected if there is another user in the sample set of users with unmapped attributes. If another user may be selected, then process 1100 may loop to block 1104; otherwise, process 1100 may return to a calling process to perform other actions.

Although FIG. 11 describes an iterative process for mappings attributes of each individual user, embodiments are not so limited. For example, in some other embodiments, attributes may be mapped together if two or more user profiles include the same attributes. For example, "baseball" may be mapped to "football" if two user profiles from the sample set of users includes both "baseball" and "football."

Figure 12:
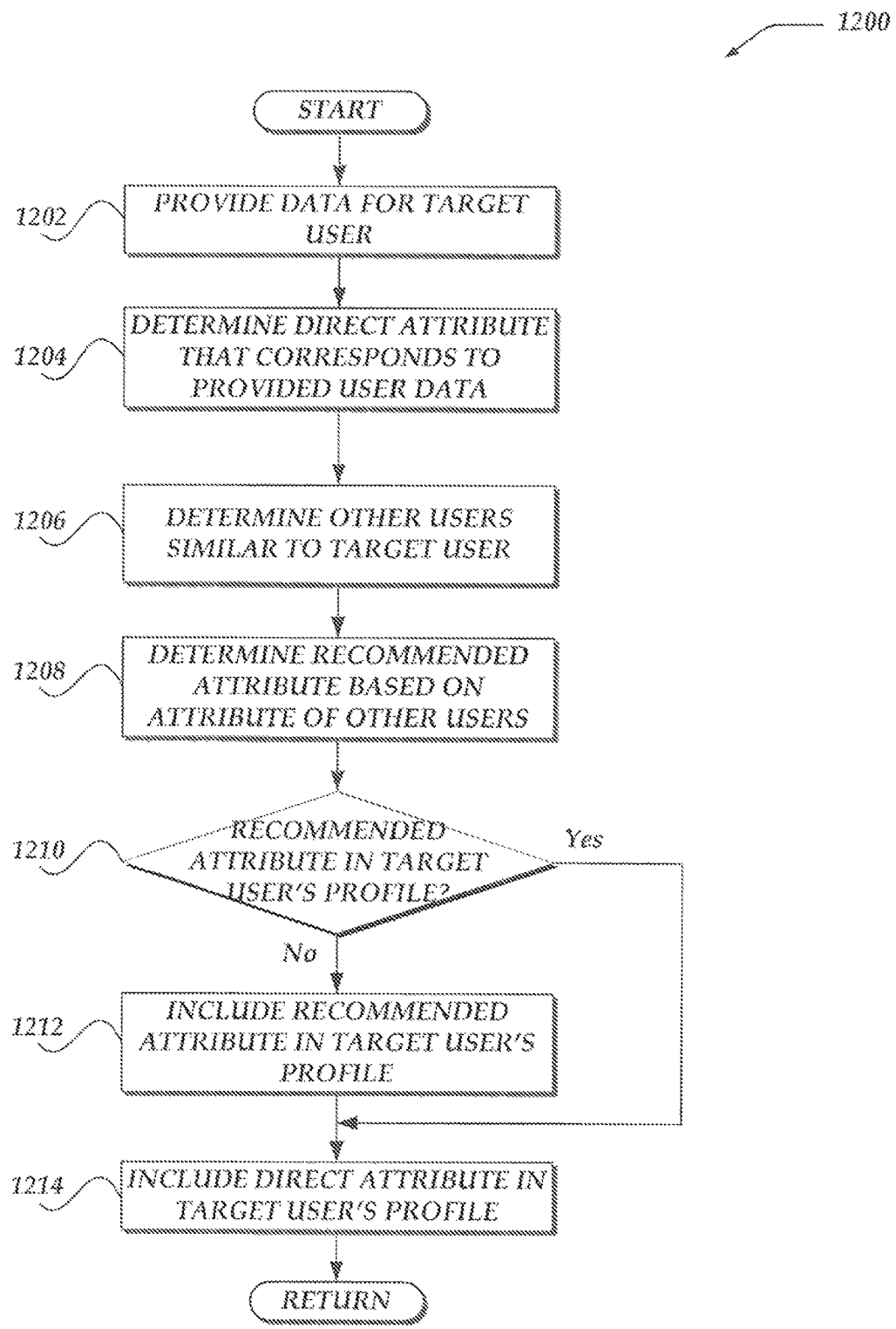
FIG. 12 illustrates a logical flow diagram generally showing one embodiment of a process for determining recommended attributes for a user based on attributes of other similar users.

FIG. 12 illustrates a logical flow diagram generally showing one embodiment of a process for determining recommended attributes for a user based on attributes of other similar users. In some embodiments, process 1200 of FIG. 12 may be implemented by and/or executed on a single network device, such as network device 300 of FIG. 3. In other embodiments, process 1200 or portions of process 1200 of FIG. 12 may be implemented by and/or executed on a plurality of network devices, such as network device 300 of FIG. 3.

Process 1200 begins, after a start block, at block 1202, where data may be provided for a target user. In at least one embodiment, block 1202 may employ embodiment of block 902 of FIG. 9 to provide user data.

Process 1200 proceeds to block 1204, where at least one direct attribute that corresponds to the user data may be determined. In at least one embodiment, block 1204 may employ embodiments of block 904 of FIG. 9 to determine at least one direct attribute.

Process 1200 continues next at block 1206, where at least one other user that is similar to the target user may be determined. In some embodiments, the other users determined to be similar to the target user may be those users whose profiles that are most similar to the profile of the target user. In at least one embodiment, a profile of each of a plurality of other users (where each profile includes at least one attribute) may be compared to the profile of the target user. In some embodiments, a comparison algorithm (or other scoring metric) may be employed to determine a score for each of the plurality of other users based on a corresponding profile and the profile of the target user.

Based on the scores of each of the plurality of other users, a subset of the plurality of other users may be determined. In some embodiments, a size (i.e., a number of users) of the subset of other users may be a predetermined number of users, such as, for example, 10 users. However, the size of the subset of other users may be modified based on a determination how relevant the recommended attributes may be to the target user. In some embodiments, a smaller subset of other users (e.g., five users) may enable more relevant recommended attributes to the target user when compared to a larger subset of other users (e.g., 20 users). However, embodiments are not so limited. For example, in other embodiments, the subset of other users may be determined based on scores of other users above a threshold value. In some embodiments, the threshold value may be predetermined, modifiable, or the like.

In any event process 1200 proceeds next to block 1208 where at least one recommended attribute may be determined based on attributes of the other similar users. In at least one embodiment, the at least one recommended attribute may be attributes in the profiles of the subset of other users.

Process 1200 continues at decision block 1210, where a determination may be made whether the recommended attribute is in the target user's profile. In at least one embodiment, this determination may be based on a comparison of the at least one recommended attribute and attributes currently in the target user's profile. In some embodiments, some recommended attributes may be in the target user's profile and other recommended attributes may not be in the target user's profile. If a recommended attribute is in the target user's profile, then process 1200 may flow to block 1214; otherwise, process 1200 may flow to block 1212. In at least one embodiment, block 1212 may be employed for each recommended attribute not in the target user's profile.

At block 1212, the at least one recommended attribute may be included in the target user's profile. In at least one embodiment, block 1212 may employ embodiments of block 908 of FIG. 9 to store the recommended attribute in the target user's profile, such that it is indistinguishable from other attributes as to whether the attribute was provided for the user or recommended for the user.

Process 1200 proceed to block 1214, where the at least one direct attribute may be included in the target user's profile. In at least one embodiment, block 1214 may employ embodiments of block 908 of FIG. 9 to store the direct attribute in the target user's profile, such that it is indistinguishable from other attributes as to whether the attribute was provided for the user or recommended for the user.

After block 1214, process 1200 may return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Use Case Example of Mapping Attributes

Figure 13:
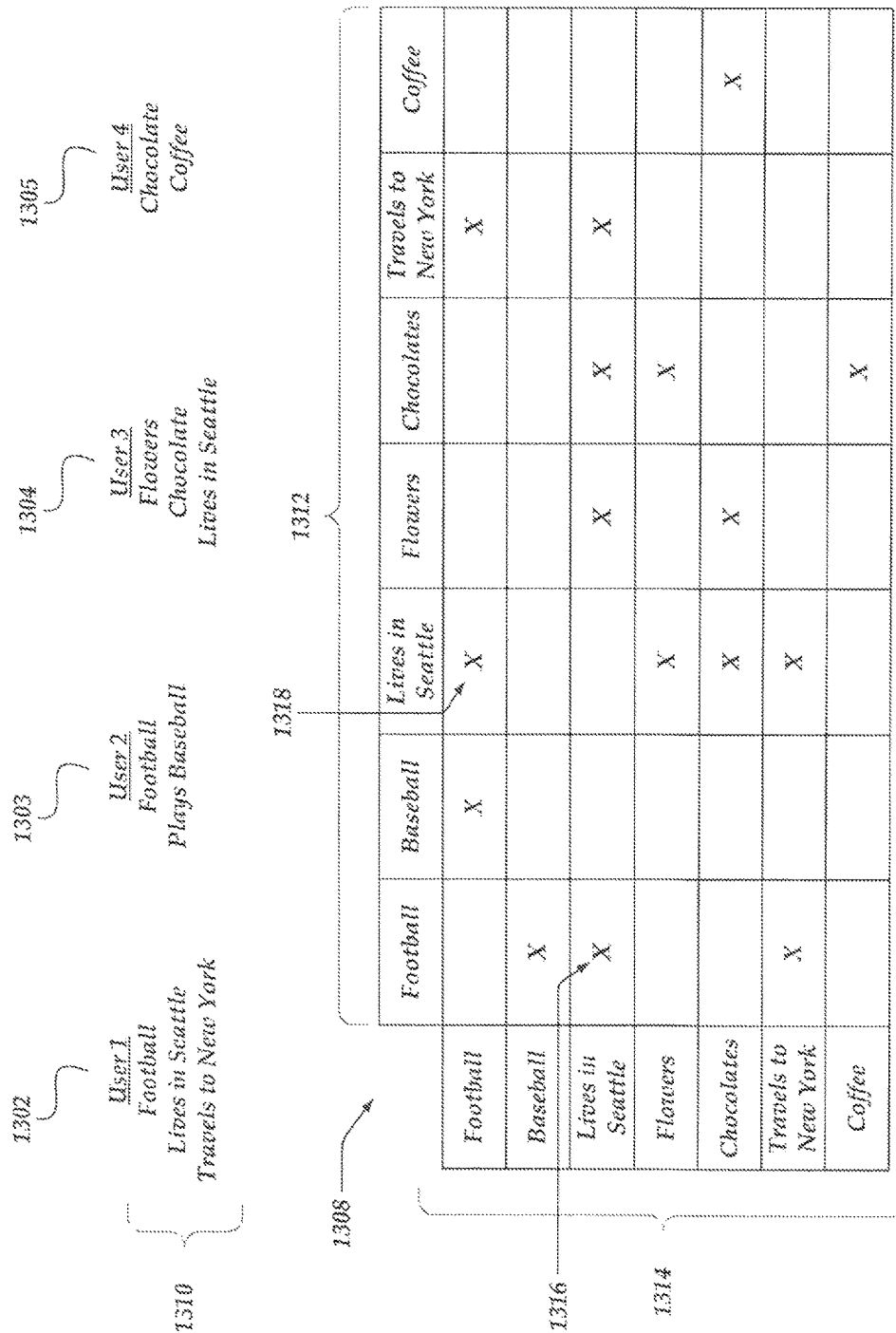
FIG. 13 shows an embodiment of a use case illustrating a mapping between a plurality of attributes for a plurality of users.

FIG. 13 shows an embodiment of a use case illustrating a mapping between a plurality of attributes for a plurality of users. As illustrated a plurality of users (e.g., users 1302-1305) may each have a corresponding profile, such as profile 1310. Profile 1310 may include one or more attributes for the corresponding user. Profile 1310 may store attributes such that the attributes are indistinguishable as to whether they are direct attributes for the user or recommended attributes for the user. As illustrated, profile 1310 for user 1302 may include the attributes "football," lives in Seattle," and "travels to New York."

Table 1308 may be an embodiment of a mapping between a plurality of attributes for a plurality of users. Attributes 1312 and 1314 may include each attribute included in a profile of users 1302-1305. Within each cell in table 1308, an "X" may indicate that a corresponding attribute 1312 and a corresponding attribute 1314 that are mapped (i.e., linked) together.

In at least one embodiment, two attributes may be mapped to each other if they are both included in the same profile. For example, profile 1310 for user 1302 includes the attributes "football" and "lives in Seattle." Accordingly, table 1308 may include a mapping from "football" to "lives in Seattle" (labeled as 1316) and from "lives in Seattle to "football" (labeled as 1318). In other embodiments (not illustrated), two attributes may be mapped to each other if they are both included in more than one profile.

In some embodiments, table 1308 may be employed to determine at least one recommended attribute based on a direct attribute (e.g., at block 1008 of FIG. 10). For example, to employ table 1308 to determine at least one recommended attribute, attributes 1312 may be direct attributes and attributes 1314 may be recommended attributes. Assume, for example, user 1305 searches for baseball memorabilia. The system may determine "baseball" as a direct attribute for user 1305 (e.g., at block 1006 of FIG. 10). The column associated with "baseball" (of attributes 1312) may be utilized to determine corresponding mapped attributes. As illustrated, "baseball" is mapped to "football," which may be utilized as the at least one recommended attribute. Accordingly, "football," as well as "baseball," may be added (not shown) to the profile of user 1305.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A computer-implemented method, comprising:
    collecting user data associated with a plurality of user devices, the user data being collected from one or more data sources, and the user data representing one or more interactions between a user device of the plurality of user devices and a website;
    generating each of a first user profile and a second user profile based, at least in part, on the collected user data, the first user profile corresponding to at least one first direct attribute indicating a first characteristic of a first interaction between a first user device and a first website, and the second user profile corresponding to at least one second direct attribute indicating a second characteristic of a second interaction between a second user device and a second website;
    determining that an association exists between the at least one first direct attribute and the at least one second direct attribute, the association being determined based on a comparison between the first characteristic of the first interaction and the second characteristic of the second interaction;
    in response to determining that the association exists, automatically determining that the at least one second direct attribute is a recommended attribute for the first user profile;
    maintaining, at a server, a mapping table in a non-transitory computer readable medium at a computing device, the mapping table comprising a plurality of entries, at least one entry of the plurality of entries representing an association between the at least one first direct attribute of the first user profile and the recommended attribute, each of one or more other entries of the plurality of the entries corresponding to an association between a direct attribute of a user profile and a recommended attribute that is determined from a direct attribute of another user profile, and the mapping table being populated using at least the collected user data; and
    receiving a query for user profiles from a user data requestor, the query including at least one target attribute used to query for target users;
    processing the collected user data in response to the query, by:
        querying the collected user data using the at least one target attribute;
        generating a data set as a result of the querying, the data set including one or more subsets of the data set, each subset the one or more subsets of the data set including one or more user profiles associated with the at least one target attribute, and a particular subset of the one or more subsets of the data set including the first user profile;
    calculating, for each subset of the one or more subsets of the data set, a weight using a number of user profiles included in the subset, the weight representing the number of user profiles included in the subset, and the weight being usable by user data requestors to determine content to transmit to users;
    determining that the first user profile includes unique user data that uniquely identifies a user associated with the first user profile, the determination causing the server to inhibit transferring the data set in response to the query;
    in response to the determination that the first user profile includes unique user data, accessing the mapping table to select one or more recommended attributes to obscure the unique user data;
    determining, using the mapping table, that the recommended attribute is associated with the at least one first direct attribute;
    automatically modifying the first user profile by adding the recommended attribute to the first user profile, the modified first user profile corresponding to each of the at least one first direct attribute and the recommended attribute, the modification of the first user profile providing anonymity for the first user device by adding noise to the first user profile, and the noise obscuring the unique user data; and
    in response to the query, transmitting the data set to the user data requestor, the data set including the modified first user profile, the modified first user profile including each of the at least one first direct attribute and the recommended attribute, each of the at least one first direct attribute and the recommended attribute being stored within the first user profile without any identifiers that could indicate whether individual attributes are either a direct attribute or a recommended attribute, wherein the at least one first direct attribute and the recommended attribute are indistinguishable in the modified first user profile as to whether they are provided for the first user device or recommended for the first user device, wherein the modified first user profile provides anonymity for the user by including attributes of other users in the first user profile, and wherein receiving the data set enables the user data requestor to select content based on the weight associated with the particular subset and transmit the selected content to the first user device associated with the first user profile.

2. The computer-implemented method of claim 1, wherein determining the recommended attribute further comprises:
    employing a mapping between a plurality of attributes for a plurality of users having a determined degree of separation from the first user device to determine the recommended attribute that corresponds to the at least one first direct attribute.

3. The computer-implemented method of claim 1, wherein determining the recommended attribute further comprises:
    wherein a subset of the plurality of user devices is determined by at least scoring each of the plurality of user devices based on at least a profile associated with each of the subset of the plurality of user devices.

4. The computer-implemented method of claim 1, wherein determining the recommended attribute further comprises:
employing a random attribute generator to determine the recommended attribute.

5. The method of claim 1, further comprising:
providing a query for relevant user attributes;
determining a plurality of users based on the query; and
providing a result of the query that includes at least a portion of a profile of each of the plurality of users.

6. The method of claim 5, wherein providing the result further comprises:
employing at least the portion of the profile of each of the plurality of users for use in an online advertising campaign.

7. A system for managing data over a network, comprising:
at least one network device, comprising:
a memory device that is operative to store at least instructions; and
a processor device that is operative to execute the instructions that enable actions, comprising:
collecting user data associated with a plurality of user devices, the user data being collected from one or more data sources, and the user data representing one or more interactions between a user device of the plurality of user devices and a website;
generating each of a first user profile and a second user profile based, at least in part, on the collected user data, the first user profile corresponding to at least one first direct attribute indicating a first characteristic of a first interaction between a first user device and a first website, and the second user profile corresponding to at least one second direct attribute indicating a second characteristic of a second interaction between a second user device and a second website;
determining that an association exists between the at least one first direct attribute and the at least one second direct attribute, the association being determined based on a comparison between the first characteristic of the first interaction and the second characteristic of the second interaction;
in response to determining that the association exists, automatically determining that the at least one second direct attribute is a recommended attribute for the first user profile;
maintaining, at a server, a mapping table in a non-transitory computer readable medium at a computing device, the mapping table comprising a plurality of entries, at least one entry of the plurality of entries representing an association between the at least one first direct attribute of the first user profile and the recommended attribute, each of one or more other entries of the plurality of the entries corresponding to an association between a direct attribute of a user profile and a recommended attribute that is determined from a direct attribute of another user profile, and the mapping table being populated using at least the collected user data;
receiving a query for user profiles from a user data requestor, the query including at least one target attribute used to query for target users;
processing the user data in response to the query, by:
querying the collected user data using the at least one target attribute;
generating a data set as a result of the querying, the data set including one or more subsets of the data set, each subset the one or more subsets of the data set including one or more user profiles associated with the at least one target attribute, and a particular subset of the one or more subsets of the data set including the first user profile;
calculating, for each subset of the one or more subsets of the data set, a weight using a number of user profiles included in the subset, the weight representing the number of user profiles included in the subset, and the weight being usable by user data requestors to determine content to transmit to users;
determining that the first user profile includes unique user data that uniquely identifies a user associated with the first user profile, the determination causing the server to inhibit transferring the data set in response to the query;
in response to the determination that the first user profile includes unique user data, accessing the mapping table to select one or more recommended attributes to obscure the unique user data;
determining, using the mapping table, that the recommended attribute is associated with the at least one first direct attribute;
automatically modifying the first user profile by adding the recommended attribute to the first user profile, the modified first user profile corresponding to each of the at least one first direct attribute and the recommended attribute, the modification of the first user profile providing anonymity for the first user device by adding noise to the first user profile, and the noise obscuring the unique user data; and
in response to the query, transmitting the data set to the user data requestor, the data set including the modified first user profile, the modified first user profile including each of the at least one first direct attribute and the recommended attribute, each of the at least one first direct attribute and the recommended attribute being stored within the first user profile without any identifiers that could indicate whether individual attributes are either a direct attribute or a recommended attribute, wherein the at least one first direct attribute and the recommended attribute are indistinguishable in the modified first user profile as to whether they are provided for the first user device or recommended for the first user device, wherein the modified first user profile provides anonymity for the user by including attributes of other users in the first user profile, and wherein receiving the data set enables the user data requestor to select content based on the weight associated with the particular subset and transmit the selected content to the first user device associated with the first user profile.

8. The system of claim 7, wherein determining the recommended attribute further comprises:
employing a mapping between a plurality of attributes for a plurality of users having a determined degree of separation from the first user device to determine the recommended attribute that corresponds to the at least one first direct attribute.

9. The system of claim 7, wherein determining the recommended attribute further comprises:

wherein a subset of the plurality of user devices is determined by at least scoring each of the plurality of user devices based on at least a profile associated with each of the subset of the plurality of user devices.

10. The system of claim 7, wherein the actions further comprise:
providing a query for relevant user attributes;
determining a plurality of users based on the query; and
providing a result of the query that includes at least a portion of a profile of each of the plurality of users.

11. The system of claim 10, wherein providing the result further comprises:
employing at least the portion of the profile of each of the plurality of users for use in an online advertising campaign.

12. A processor readable non-transitory storage media that includes instructions for managing data over a network, wherein execution of the instructions by a processor enables actions, comprising:
collecting user data associated with a plurality of user devices, the user data being collected from one or more data sources, and the user data representing one or more interactions between a user device of the plurality of user devices and a website;
generating each of a first user profile and a second user profile based, at least in part, on the collected user data, the first user profile corresponding to at least one first direct attribute indicating a first characteristic of a first interaction between a first user device and a first website, and the second user profile corresponding to at least one second direct attribute indicating a second characteristic of a second interaction between a second user device and a second website;
determining that an association exists between the at least one first direct attribute and the at least one second direct attribute, the association being determined based on a comparison between the first characteristic of the first interaction and the second characteristic of the second interaction;
in response to determining that the association exists, automatically determining that the at least one second direct attribute is a recommended attribute for the first user profile;
maintaining, at a server, a mapping table in a non-transitory computer readable medium at a computing device, the mapping table comprising a plurality of entries, at least one entry of the plurality of entries representing an association between the at least one first direct attribute of the first user profile and the recommended attribute, each of one or more other entries of the plurality of the entries corresponding to an association between direct attribute of a user profile and a recommended attribute that is determined from a direct attribute of another user profile, and the mapping table being populated using at least the collected user data; and
receiving a query for user profiles from a user data requestor, the query including at least one target attribute used to query for target users;
processing the collected user data in response to the query, by:
querying the collected user data using the at least one target attribute;
generating a data set as a result of the querying, the data set including one or more subsets of the data set, each subset the one or more subsets of the data set including one or more user profiles associated with the at least one target attribute, and a particular subset of the one or more subsets of the data set including the first user profile;
calculating, for each subset of the one or more subsets of the data set, a weight using a number of user profiles included in the subset, the weight representing the number of user profiles included in the subset, and the weight being usable by user data requestors to determine content to transmit to users;
determining that the first user profile includes unique user data that uniquely identifies a user associated with the first user profile, the determination causing the server to inhibit transferring the data set in response to the query;
in response to the determination that the first user profile includes unique user data, accessing the mapping table to select one or more recommended attributes to obscure the unique user data;
determining, using the mapping table, that the recommended attribute is associated with the at least one first direct attribute;
automatically modifying the first user profile by adding the recommended attribute to the first user profile, the modified first user profile corresponding to each of the at least one first direct attribute and the recommended attribute, the modification of the first user profile providing anonymity for the first user device by adding noise to the first user profile, and the noise obscuring the unique user data; and
in response to the query, transmitting the data set to the user data requestor, the data set including the modified first user profile, the modified first user profile including each of the at least one first direct attribute and the recommended attribute, each of the at least one first direct attribute and the recommended attribute being stored within the first user profile without any identifiers that could indicate whether individual attributes are either a direct attribute or a recommended attribute, wherein the at least one first direct attribute and the recommended attribute are indistinguishable in the modified first user profile as to whether they are provided for the first user device or recommended for the first user device, wherein the modified first user profile provides anonymity for the user by including attributes of other users in the first user profile, and wherein receiving the data set enables the user data requestor to select content based on the weight associated with the particular subset and transmit the selected content to the first user device associated with the first user profile.

13. The media of claim 12, wherein determining the recommended attribute further comprises:
employing a mapping between a plurality of attributes for a plurality of users having a determined degree of separation from the first user device to determine the recommended attribute that corresponds to the at least one first direct attribute.

14. The media of claim 12, wherein determining the recommended attribute further comprises:
wherein a subset of the plurality of user devices is determined by at least scoring each of the plurality of user devices based on at least a profile associated with each of the subset of the plurality of user devices.

15. The media of claim 12, wherein determining the recommended attribute further comprises:
employing a random attribute generator to determine the at least one recommended attribute.

16. The media of claim 12, wherein the actions further comprise:
provide a query for relevant user attributes;
determining a plurality of users based on the query; and
providing a result of the query that includes at least a portion of a profile of each of the plurality of users.

17. The media of claim 16, wherein providing the result further comprises:
employing at least the portion of the profile of each of the plurality of users for use in an online advertising campaign.

* * * * *